United States Patent
LeBeau et al.

(10) Patent No.: US 12,293,762 B2
(45) Date of Patent: *May 6, 2025

(54) MULTI-MODE GUARD FOR VOICE COMMANDS

(71) Applicant: GOOGLE LLC, Mountain View, CA (US)

(72) Inventors: Michael J. LeBeau, New York, NY (US); Mat Balez, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 18/083,315

(22) Filed: Dec. 16, 2022

(65) Prior Publication Data

US 2023/0120601 A1 Apr. 20, 2023

Related U.S. Application Data

(63) Continuation of application No. 17/109,265, filed on Dec. 2, 2020, now abandoned, which is a continuation
(Continued)

(51) Int. Cl.
*G10L 15/22* (2006.01)
*G10L 15/08* (2006.01)

(52) U.S. Cl.
CPC ........ *G10L 15/22* (2013.01); *G10L 2015/088* (2013.01); *G10L 2015/223* (2013.01); *G10L 2015/228* (2013.01)

(58) Field of Classification Search
CPC ......... G10L 15/00; G10L 15/08; G10L 15/22; G10L 15/26; G10L 15/265
See application file for complete search history.

(56) References Cited

U.S. PATENT DOCUMENTS 6,081,782 A 6/2000 Rabin
6,127,990 A 10/2000 Zwern
(Continued)

FOREIGN PATENT DOCUMENTS

WO 2009013518 1/2009
WO 2012040086 3/2012

OTHER PUBLICATIONS

Bringert et al., U.S. Appl. No. 13/620,987, filed Sep. 15, 2012. 29 pages.
(Continued)

*Primary Examiner* — Seong-Ah A Shin
(74) *Attorney, Agent, or Firm* — Gray Ice Higdon

(57) ABSTRACT

Embodiments may be implemented by a computing device, such as a head-mountable display, in order to use a single guard phrase to enable different voice commands in different interface modes. An example device includes an audio sensor and a computing system configured to analyze audio data captured by the audio sensor to detect speech that includes a predefined guard phrase, and to operate in a plurality of different interface modes comprising at least a first and a second interface mode. During operation in the first interface mode, the computing system may initially disable one or more first-mode speech commands, and respond to detection of the guard phrase by enabling the one or more first-mode speech commands. During operation in the second interface mode, the computing system may initially disable a second-mode speech command, and to respond to the guard phrase by enabling the second-mode speech command.

23 Claims, 14 Drawing Sheets

Related U.S. Application Data of application No. 16/216,516, filed on Dec. 11, 2018, now Pat. No. 10,891,953, which is a continuation of application No. 15/371,027, filed on Dec. 6, 2016, now Pat. No. 10,181,324, which is a continuation of application No. 13/859,588, filed on Apr. 9, 2013, now Pat. No. 9,530,410.

(56) References Cited

U.S. PATENT DOCUMENTS

| | | |
|---|---|---|
| 6,233,560 B1 | 5/2001 | Tannenbaum |
| 6,456,977 B1 | 9/2002 | Wang |
| 6,928,614 B1 | 8/2005 | Everhart |
| 7,023,498 B2 | 4/2006 | Ishihara |
| 7,324,947 B2 | 1/2008 | Jordan et al. |
| 7,720,683 B1 | 5/2010 | Vermeulen et al. |
| 8,019,606 B2 | 9/2011 | Badger et al. |
| 8,161,172 B2 | 4/2012 | Reisman |
| 8,165,886 B1 | 4/2012 | Gagnon et al. |
| 8,195,467 B2 | 6/2012 | Mozer et al. |
| 8,234,119 B2 | 7/2012 | Dhawan et al. |
| 8,452,602 B1 | 5/2013 | Bringert et al. |
| 8,515,766 B1 | 8/2013 | Bringert et al. |
| 8,620,667 B2 | 12/2013 | Andrew |
| 8,650,036 B2 * | 2/2014 | Han ............... H04N 21/42204 704/275 |
| 8,924,219 B1 | 12/2014 | Bringert et al. |
| 8,977,255 B2 * | 3/2015 | Freeman ........... H04M 1/72454 455/425 |
| 9,275,637 B1 | 3/2016 | Salvador et al. |
| 9,530,410 B1 * | 12/2016 | LeBeau ................ G10L 15/22 |
| 9,686,595 B2 | 6/2017 | Fabian-Issacs et al. |
| 10,181,324 B2 * | 1/2019 | LeBeau ................ G10L 15/22 |
| 10,891,953 B2 * | 1/2021 | LeBeau ................ G10L 15/22 |
| 2002/0193989 A1 | 12/2002 | Geilhufe et al. |
| 2003/0005076 A1 | 1/2003 | Koch et al. |
| 2003/0028382 A1 | 2/2003 | Chambers et al. |
| 2004/0225499 A1 | 11/2004 | Wang et al. |
| 2006/0074658 A1 | 4/2006 | Chadha |
| 2007/0069976 A1 | 3/2007 | Willins et al. |
| 2007/0213984 A1 | 9/2007 | Ativanichayaphong et al. |
| 2008/0065486 A1 | 3/2008 | Vincent et al. |
| 2009/0177477 A1 | 7/2009 | Nenov et al. |
| 2009/0262205 A1 | 10/2009 | Smith |
| 2009/0328101 A1 | 12/2009 | Suomela et al. |
| 2010/0031150 A1 | 2/2010 | Andrew |
| 2010/0076850 A1 | 3/2010 | Parekh et al. |
| 2010/0079356 A1 | 4/2010 | Hoellwarth |
| 2010/0312547 A1 | 12/2010 | Van Os et al. |
| 2010/0332236 A1 | 12/2010 | Tan |
| 2011/0075818 A1 | 3/2011 | Vance et al. |
| 2011/0187640 A1 | 8/2011 | Jacobsen et al. |
| 2012/0182205 A1 | 7/2012 | Gamst |
| 2012/0235896 A1 | 9/2012 | Jacobsen et al. |
| 2012/0253824 A1 | 10/2012 | Talavera |
| 2013/0018659 A1 | 1/2013 | Chi |
| 2013/0035941 A1 | 2/2013 | Kim et al. |
| 2013/0090930 A1 | 4/2013 | Monson et al. |
| 2013/0226591 A1 | 8/2013 | Ahn et al. |
| 2013/0253937 A1 | 9/2013 | Cho et al. |
| 2013/0275875 A1 | 10/2013 | Gruber et al. |
| 2013/0289986 A1 | 10/2013 | Graylin |
| 2013/0325484 A1 | 12/2013 | Chakladar et al. |
| 2013/0339028 A1 | 12/2013 | Rosner et al. |
| 2014/0006022 A1 | 1/2014 | Yoon et al. |
| 2014/0074481 A1 | 3/2014 | Newman |
| 2014/0122087 A1 | 5/2014 | Macho |
| 2014/0201639 A1 | 7/2014 | Savolainen et al. |
| 2014/0222436 A1 | 8/2014 | Binder et al. |
| 2014/0244253 A1 | 8/2014 | Bringert et al. |
| 2014/0270258 A1 | 9/2014 | Wang |
| 2014/0278419 A1 | 9/2014 | Bishop et al. |
| 2014/0337028 A1 | 11/2014 | Wang et al. |
| 2015/0279839 A1 | 10/2015 | Lebeau et al. |
| 2021/0082435 A1 * | 3/2021 | LeBeau ................ G10L 15/22 |
| 2021/0314282 A1 * | 10/2021 | Sharma ................ G06F 3/167 |

OTHER PUBLICATIONS

Lebeau et al., U.S. Appl. No. 13/622,180, filed Sep. 18, 2012. 31 pages.

Office Action for U.S. Appl. No. 13/754,488 mailed Mar. 23, 2015. 14 pages.

Notice of Allowance for U.S. Appl. No. 13/754,488 mailed Jul. 13, 2015. 9 pages.

* cited by examiner

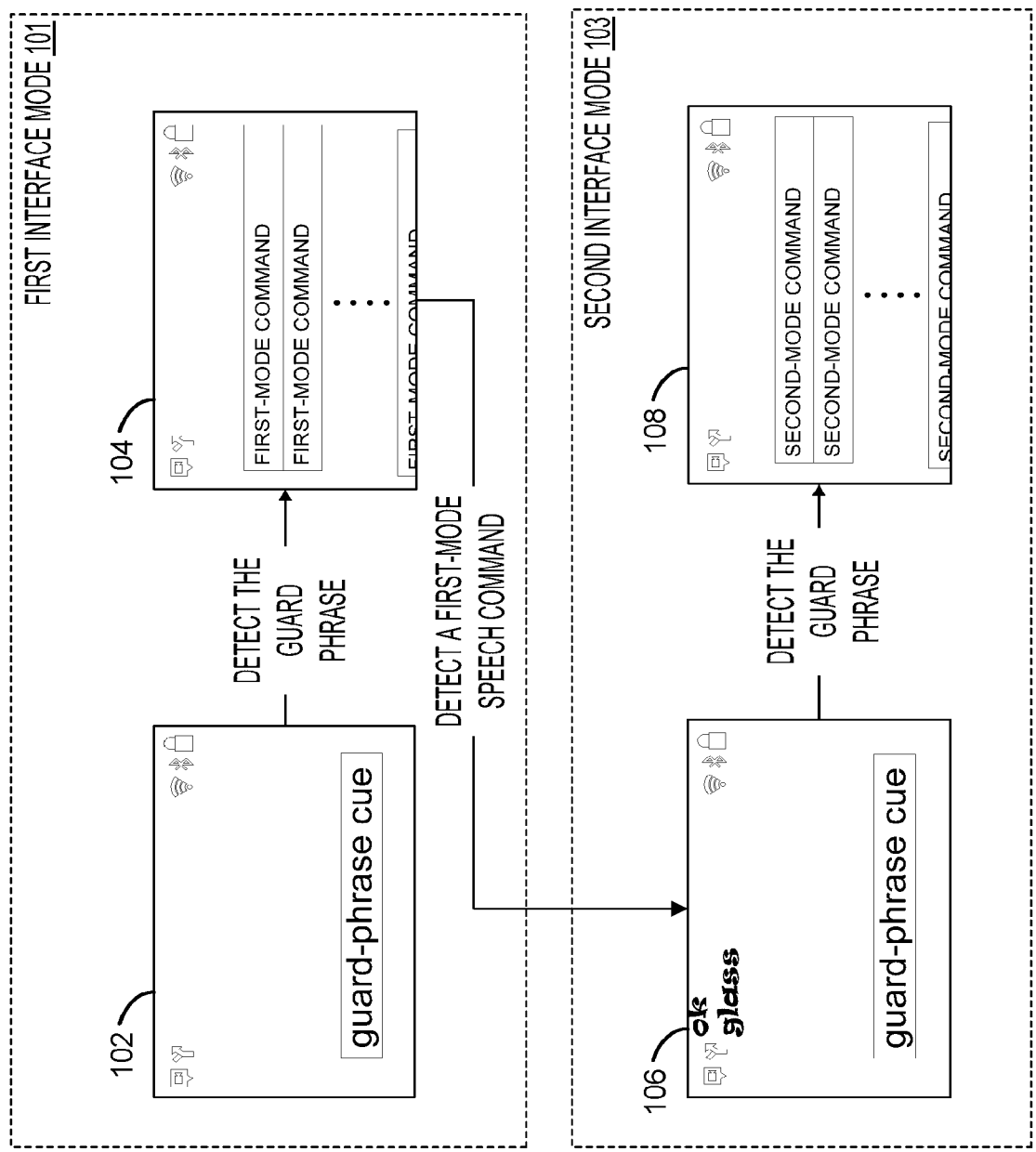

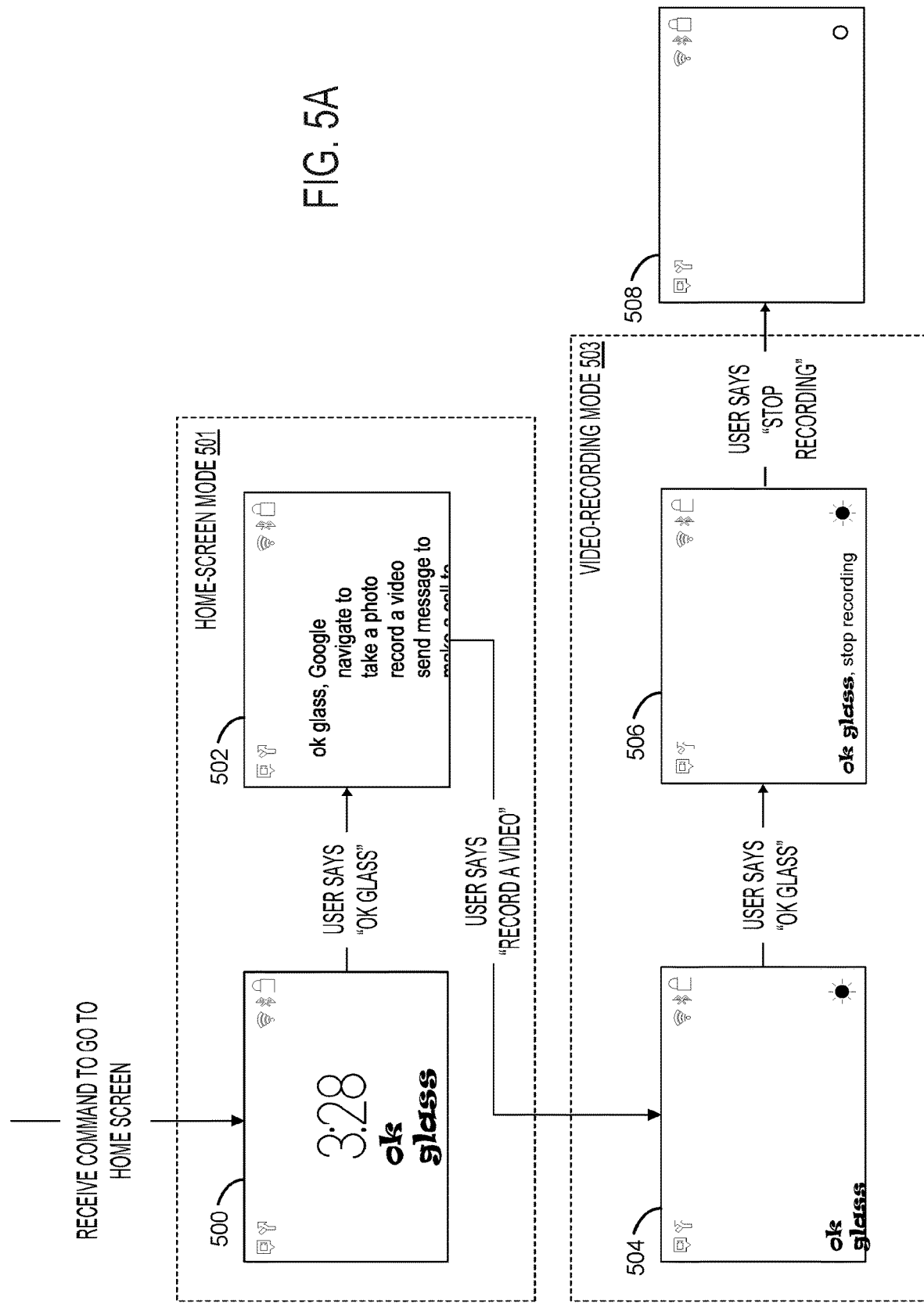

MULTI-MODE GUARD FOR VOICE COMMANDS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

An example head-mountable device (HMD) may be operable to receive and interpret voice commands. In this and other contexts, it may be desirable to disable certain voice commands until a guard phrase is detected, in order to reduce the occurrence of false-positive detections of voice commands. It may also be desirable for the HMD to support speech commands in some places within a UI, but not in others. However, it can be challenging to make such a UI simple for users to understand, such that the user knows when certain speech commands are and are not available. Accordingly, an example HMD may be configured to respond to the same guard phrase in different ways, depending upon the state the UI. In particular, an HMD may define a single, multi-modal, guard phrase, and may also define multiple interface modes that correspond to different states of the HMD's UI. The same guard phrase may therefore be used to enable a different speech command or commands in different interface modes.

In one aspect, a device may include at least one audio sensor and a computing system configured to: (a) analyze audio data captured by the at least one audio sensor in order to detect speech that includes a predefined guard phrase and (b) operate in a plurality of different interface modes comprising at least a first and a second interface mode. During operation in the first interface mode, the computing system is configured to initially disable one or more first-mode speech commands, and to respond to detection of the guard phrase by enabling the one or more first-mode speech commands. During operation in the second interface mode, the computing system is configured to initially disable one or more second-mode speech commands, and to respond to detecting the guard phrase by enabling the one or more second-mode speech commands.

In another aspect, a computer-implemented method may involve: (a) a computing device operating in a first interface mode, wherein, during operation in the first interface mode, the computing device initially disables one or more first-mode speech commands, and responds to detection of a guard phrase by enabling the one or more first-mode speech commands; and (b) a computing device operating in a second interface mode, wherein, during operation in the second interface mode, the computing device initially disables one or more second-mode speech commands, and responds to detection of a guard phrase by enabling the one or more second-mode speech commands.

In a further aspect, a non-transitory computer readable medium may have stored therein instructions that are executable by a computing device to cause the computing device to perform functions comprising: (a) operating in a first interface mode, wherein the functions for operating in the first interface mode comprise initially disabling one or more first-mode speech commands, and responding to detection of a guard phrase by enabling the one or more first-mode speech commands; and (b) operating in a second interface mode, wherein the functions for operating in the second interface mode comprise initially disabling one or more second-mode speech commands, and responding to detection of a guard phrase by enabling the one or more second-mode speech commands.

In yet a further aspect, a system may include: (a) a means for causing a computing device to operate in a first interface mode, wherein, during operation in the first interface mode, the computing device initially disables one or more first-mode speech commands and responds to detection of a guard phrase by enabling the one or more first-mode speech commands; and (b) a means for causing a computing device to operate in a second interface mode, wherein, during operation in the second interface mode, the computing device initially disables one or more second-mode speech commands and responds to detection of a guard phrase by enabling the one or more second-mode speech commands.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 1 shows screen views of a user-interface during a transition between two interface modes, according to an example embodiment.

FIGS. 5A to 5C illustrate applications of a multi-mode guard phrase, according to example embodiments.

DETAILED DESCRIPTION

Figure 2A:
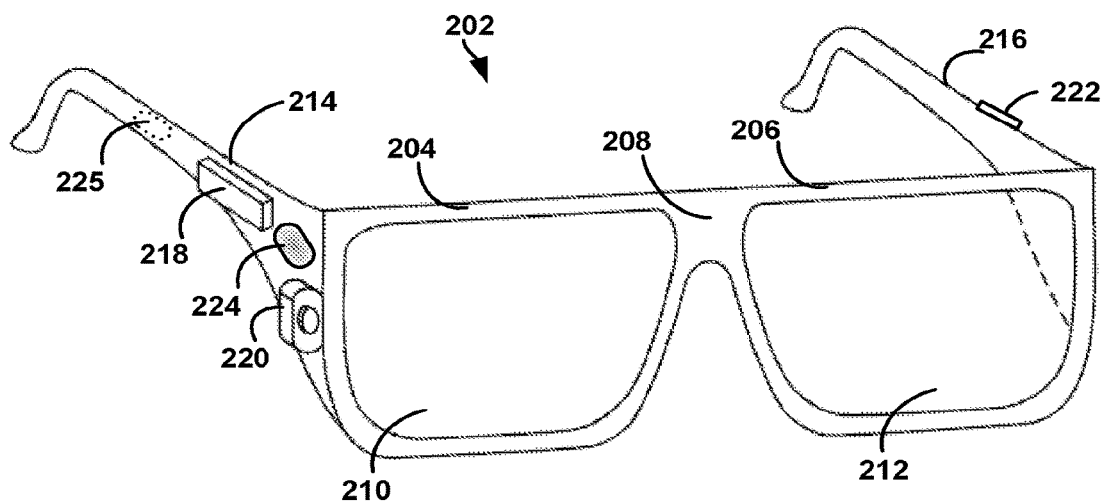
FIG. 2A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A head-mountable device (HMD) may be configured to provide a voice interface, and as such, may be configured to listen for commands that are spoken by the wearer. Herein spoken commands may be referred to interchangeably as either "voice commands" or "speech commands."

When an HMD enables speech commands, the HMD may continuously listen for speech, so that a user can readily use the speech commands to interact with the HMD. In such case, it may be desirable to implement a "guard phrase," which the user must recite before the speech commands are enabled. By disabling voice commands until such a guard phrase is detected, an HMD may be able to reduce the occurrence of false-positives. In other words, the HMD may be able to reduce instances where the HMD incorrectly interprets speech as including a particular speech command, and thus takes an undesired action. However, implementing such a guard phrase in a streamlined manner may be difficult, as users can perceive the need to speak a guard word before a speech command as an extra step that complicates a UI.

Further, it may also be desirable for an HMD to support speech commands in some places within a user interface (UI), but not in others. However, it can be challenging to make such a UI simple for users to understand (e.g., so that the user knows when speech commands are and are not available). This can be further complicated by the fact that different speech commands may be needed in different places within the UI.

According to an example embodiment, an HMD may be configured to respond to the same guard phrase in different ways, depending upon the state the UI. In particular, an HMD may define multiple interface modes that correspond to different states of the HMD's UI. Each interface mode may have a different "hotword" model that, when loaded, listens for one or more speech commands that are specific to the particular interface mode.

In a further aspect, the HMD may define a single guard phrase to be used in multiple interface modes where speech commands are available. This guard phrase may be to be a multi-modal guard phrase, since it is used in the same way across multiple interface modes. Notably however, the actions taken by HMD in response to detecting the guard phrase are non-modal, as the HMD does not change the interface mode when the guard phrase is detected. Rather, the guard phrase may be used to enable a different speech command or commands in different interface modes (e.g., by activating the different hotword processes specified by the different interface modes).

Configured as such, an example HMD may switch between different interface modes in order to operate in whichever interface mode corresponds to the current state of the UI (typically the interface mode that provides for speech command(s) that are useful in the current UI state). Each time the HMD switches to a different interface mode, the HMD may disable voice interaction (e.g., by unloading the previous mode's hotword process and/or refraining from loading the new mode's hotword process), and require that the user say the guard phrase in order to enable the new mode's speech commands. Then, when the HMD detects the guard phrase, the HMD enables the speech command(s) that are specific to the particular interface mode (e.g., by activating the hotword process for the interface mode).

Additionally, in interface modes where speech commands can be enabled, the HMD may display a visual cue of the guard phrase, which can help alert a user that voice interaction can be enabled. And, once the HMD detects the guard phrase, the HMD may display a visual cue or cues that indicate the particular speech command(s) that have been enabled. By combining such visual cues with a multi-modal guard phrase, an HMD may allow for useful voice input in a manner that is more intuitive to the user.

For example, FIG. 1 shows screen views of a UI during a transition between two interface modes in which a multi-mode guard phrase is implemented, according to an example embodiment.

More specifically, an HMD may operate in a first interface mode 101, where one or more first-mode speech commands can be enabled by speaking a predefined guard phrase. When the HMD switches to the first interface mode 101 from another interface mode, the HMD may initially disable the first-mode speech commands and display a visual cue for the guard phrase in its display, as shown in screen view 102. If the HMD detects the guard phrase while in the first interface mode, the HMD may enable the one or more first-mode speech commands, and display visual cues that indicate the enabled first-mode speech commands, as shown in screen view 104.

To provide a specific example, the first interface mode 101 may provide an interface for a home screen, which provides a launching point for a user to access a number of frequently-used features. Accordingly, when the user speaks a command to access a different feature, such as a camera or phone feature, the HMD may switch to the interface mode that provides an interface for the different feature.

More generally, when the HMD switches to a different aspect of its UI for which one or more second-mode speech commands are supported, the HMD may switch to a second interface mode 103. When the HMD switches to the second interface mode 103, the HMD may disable any speech commands that were enabled, and listen only for the guard phrase (e.g., by loading a guard-phrase hotword process). Further, the HMD may require the user to again speak the guard phrase before enabling the one or more second-mode speech commands.

To provide a hint to the user that the guard word will enable voice commands, the HMD may again display the visual cue for the guard phrase, as shown in screen 106. And, if the HMD detects the guard phrase while in the second interface mode 103, the HMD may responsively enable the one or more second-mode speech commands (e.g., by loading the hotword process for the second interface mode). When the second-mode speech commands are enabled, the HMD may display visual cues that indicate the enabled second-mode speech commands, as shown in screen view 108.

Many implementations of a multi-mode guard phrase are possible. One implementation involves an HMD a home screen, which serves as a launch point for various different features (some or all of which may provide for voice commands), one of which may be a video camera. Thus, from the home screen, the user may say the guard phrase followed by another speech command in order to launch a camera application. Further, in some embodiments, the HMD may automatically start recording when the user launches the camera application via the home screen. During video recording, the guard phrase may be displayed to indicate that a speech command can be enabled by saying the guard word. In particular, the user may say the guard phrase followed by "stop recording" (e.g., the speech command that can be enabled in the video-recording mode), in order to stop recording video. Other implementations are also possible.

In a further aspect, a second protective feature against false positives, in addition to the multi-mode guard phrase, may be utilized in some or all interface modes. In particular, time-out process may be implemented in order to disable the enabled speech commands if at least one of the enabled speech commands is not detected within a predetermined period of time after detection of the guard phrase. For example, in the implementation described above, a time-out process may be implemented when the guard phrase is detected while the HMD is operating in the video-recording mode. As such, when the HMD detects the guard phrase, the HMD may start a timer. Then, if the HMD does not detect the "stop recording" speech command within five seconds, for example, then the HMD may disable the "stop recording" speech command, and require the guard phrase in order to re-enable the "stop recording" speech command.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices that support speech commands, such as a mobile phone, tablet computer, laptop computer, or desktop computer, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 2A illustrates a wearable computing system according to an example embodiment. In FIG. 2A, the wearable computing system takes the form of a head-mountable device (HMD) 202 (which may also be referred to as a head-mounted display). It should be understood, however, that example systems and devices may take the form of or be implemented within or in association with other types of devices, without departing from the scope of the invention. As illustrated in FIG. 2A, the HMD 202 includes frame elements including lens-frames 204, 206 and a center frame support 208, lens elements 210, 212, and extending side-arms 214, 216. The center frame support 208 and the extending side-arms 214, 216 are configured to secure the HMD 202 to a user's face via a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the HMD 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind a user's ears to secure the HMD 202 to the user. The extending side-arms 214, 216 may further secure the HMD 202 to the user by extending around a rear portion of the user's head. Additionally or alternatively, for example, the HMD 202 may connect to or be affixed within a head-mounted helmet structure. Other configurations for an HMD are also possible.

The HMD 202 may also include an on-board computing system 218, an image capture device 220, a sensor 222, and a finger-operable touch pad 224. The on-board computing system 218 is shown to be positioned on the extending side-arm 214 of the HMD 202; however, the on-board computing system 218 may be provided on other parts of the HMD 202 or may be positioned remote from the HMD 202 (e.g., the on-board computing system 218 could be wire- or wirelessly-connected to the HMD 202). The on-board computing system 218 may include a processor and memory, for example. The on-board computing system 218 may be configured to receive and analyze data from the image capture device 220 and the finger-operable touch pad 224 (and possibly from other sensory devices, user interfaces, or both) and generate images for output by the lens elements 210 and 212.

The image capture device 220 may be, for example, a camera that is configured to capture still images and/or to capture video. In the illustrated configuration, image capture device 220 is positioned on the extending side-arm 214 of the HMD 202; however, the image capture device 220 may be provided on other parts of the HMD 202. The image capture device 220 may be configured to capture images at various resolutions or at different frame rates. Many image capture devices with a small form-factor, such as the cameras used in mobile phones or webcams, for example, may be incorporated into an example of the HMD 202.

Further, although FIG. 2A illustrates one image capture device 220, more image capture device may be used, and each may be configured to capture the same view, or to capture different views. For example, the image capture device 220 may be forward facing to capture at least a portion of the real-world view perceived by the user. This forward facing image captured by the image capture device 220 may then be used to generate an augmented reality where computer generated images appear to interact with or overlay the real-world view perceived by the user.

The sensor 222 is shown on the extending side-arm 216 of the HMD 202; however, the sensor 222 may be positioned on other parts of the HMD 202. For illustrative purposes, only one sensor 222 is shown. However, in an example embodiment, the HMD 202 may include multiple sensors. For example, an HMD 202 may include sensors 202 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 224 is shown on the extending side-arm 214 of the HMD 202. However, the finger-operable touch pad 224 may be positioned on other parts of the HMD 202. Also, more than one finger-operable touch pad may be present on the HMD 202. The finger-operable touch pad 224 may be used by a user to input commands. The finger-operable touch pad 224 may sense at least one of a pressure, position and/or a movement of one or more fingers via capacitive sensing, resistance sensing, or a surface acoustic wave process, among other possibilities. The finger-operable touch pad 224 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 224 may be formed of one or more translucent or transparent insulating layers and one or more translucent or transparent conducting layers. Edges of the finger-operable touch pad 224 may be formed to have a raised, indented, or roughened surface, so as to provide tactile feedback to a user when the user's finger reaches the edge, or other area, of the finger-operable touch pad 224. If more than one finger-operable touch pad is present, each finger-operable touch pad may be operated independently, and may provide a different function.

In a further aspect, HMD 202 may be configured to receive user input in various ways, in addition or in the alternative to user input received via finger-operable touch pad 224. For example, on-board computing system 218 may implement a speech-to-text process and utilize a syntax that maps certain spoken commands to certain actions. In addition, HMD 202 may include one or more microphones via which a wearer's speech may be captured. Configured as such, HMD 202 may be operable to detect spoken commands and carry out various computing functions that correspond to the spoken commands.

As another example, HMD 202 may interpret certain head-movements as user input. For example, when HMD 202 is worn, HMD 202 may use one or more gyroscopes and/or one or more accelerometers to detect head movement. The HMD 202 may then interpret certain head-movements as being user input, such as nodding, or looking up, down, left, or right. An HMD 202 could also pan or scroll through graphics in a display according to movement. Other types of actions may also be mapped to head movement.

As yet another example, HMD 202 may interpret certain gestures (e.g., by a wearer's hand or hands) as user input. For example, HMD 202 may capture hand movements by analyzing image data from image capture device 220, and initiate actions that are defined as corresponding to certain hand movements.

As a further example, HMD 202 may interpret eye movement as user input. In particular, HMD 202 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 202 also includes a speaker 225 for generating audio output. In one example, the speaker could be in the form of a bone conduction speaker, also referred to as a bone conduction transducer (BCT). Speaker 225 may be, for example, a vibration transducer or an electroacoustic transducer that produces sound in response to an electrical audio signal input. The frame of HMD 202 may be designed such that when a user wears HMD 202, the speaker 225 contacts the wearer. Alternatively, speaker 225 may be embedded within the frame of HMD 202 and positioned such that, when the HMD 202 is worn, speaker 225 vibrates a portion of the frame that contacts the wearer. In either case, HMD 202 may be configured to send an audio signal to speaker 225, so that vibration of the speaker may be directly or indirectly transferred to the bone structure of the wearer. When the vibrations travel through the bone structure to the bones in the middle ear of the wearer, the wearer can interpret the vibrations provided by BCT 225 as sounds.

Various types of bone-conduction transducers (BCTs) may be implemented, depending upon the particular implementation. Generally, any component that is arranged to vibrate the HMD 202 may be incorporated as a vibration transducer. Yet further it should be understood that an HMD 202 may include a single speaker 225 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 225 can vibrate the wearer's bone structure.

Figure 2B:
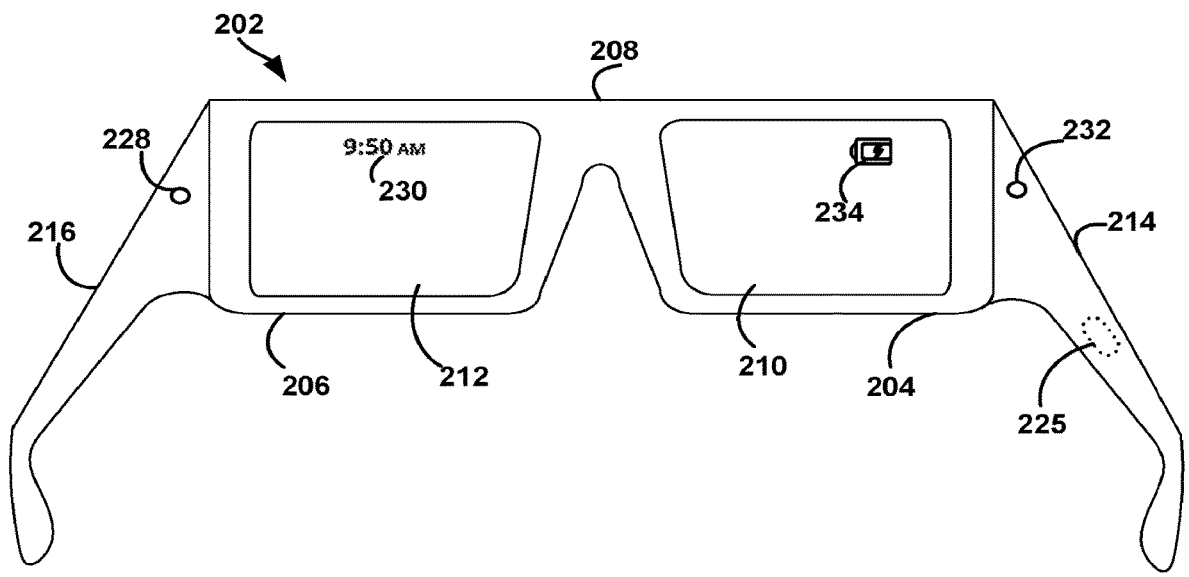
FIG. 2B illustrates an alternate view of the wearable computing device illustrated in FIG. 2A.

FIG. 2B illustrates an alternate view of the wearable computing device illustrated in FIG. 2A. As shown in FIG. 2B, the lens elements 210, 212 may act as display elements. The HMD 202 may include a first projector 228 coupled to an inside surface of the extending side-arm 216 and configured to project a display 230 onto an inside surface of the lens element 212. Additionally or alternatively, a second projector 232 may be coupled to an inside surface of the extending side-arm 214 and configured to project a display 234 onto an inside surface of the lens element 210.

The lens elements 210, 212 may act as a combiner in a light projection system and may include a coating that reflects the light projected onto them from the projectors 228, 232. In some embodiments, a reflective coating may not be used (e.g., when the projectors 228, 232 are scanning laser devices).

In alternative embodiments, other types of display elements may also be used. For example, the lens elements 210, 212 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 204, 206 for driving such a matrix display. Alternatively or additionally, a laser or LED source and scanning system could be used to draw a raster display directly onto the retina of one or more of the user's eyes. Other possibilities exist as well.

Figure 2C:
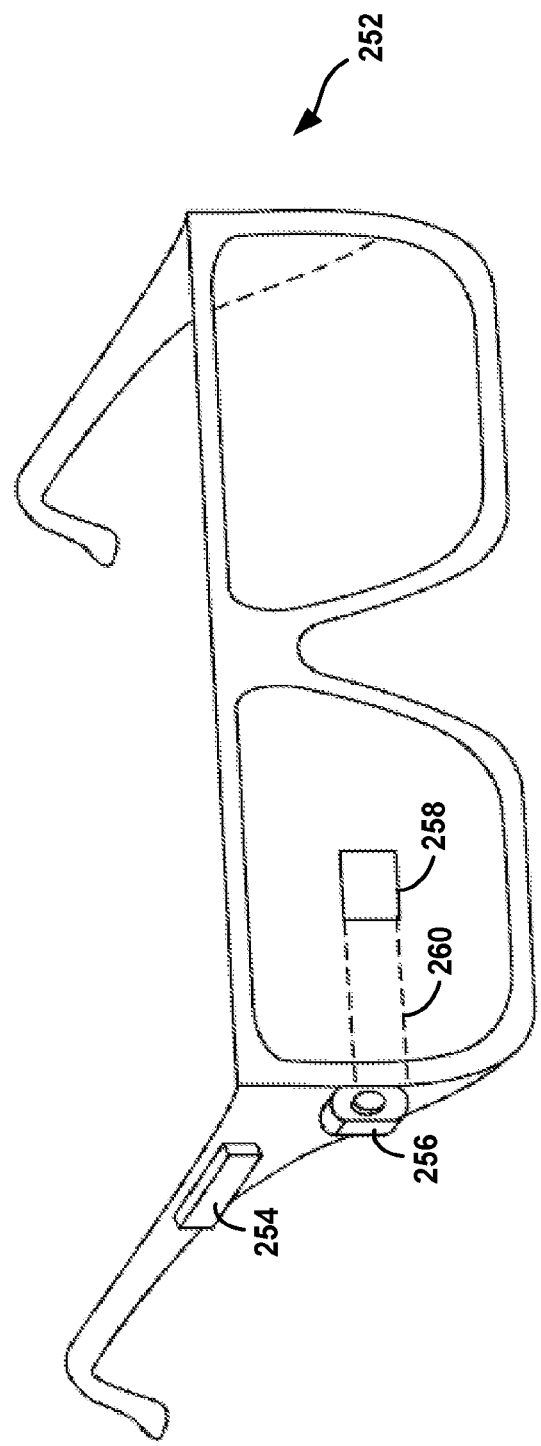
FIG. 2C illustrates another wearable computing system according to an example embodiment.

FIG. 2C illustrates another wearable computing system according to an example embodiment, which takes the form of an HMD 252. The HMD 252 may include frame elements and side-arms such as those described with respect to FIGS. 2A and 2B. The HMD 252 may additionally include an on-board computing system 254 and an image capture device 256, such as those described with respect to FIGS. 2A and 2B. The image capture device 256 is shown mounted on a frame of the HMD 252. However, the image capture device 256 may be mounted at other positions as well.

As shown in FIG. 2C, the HMD 252 may include a single display 258 which may be coupled to the device. The display 258 may be formed on one of the lens elements of the HMD 252, such as a lens element described with respect to FIGS. 2A and 2B, and may be configured to overlay computer-generated graphics in the user's view of the physical world. The display 258 is shown to be provided in a center of a lens of the HMD 252, however, the display 258 may be provided in other positions, such as for example towards either the upper or lower portions of the wearer's field of view. The display 258 is controllable via the computing system 254 that is coupled to the display 258 via an optical waveguide 260.

Figure 2D:
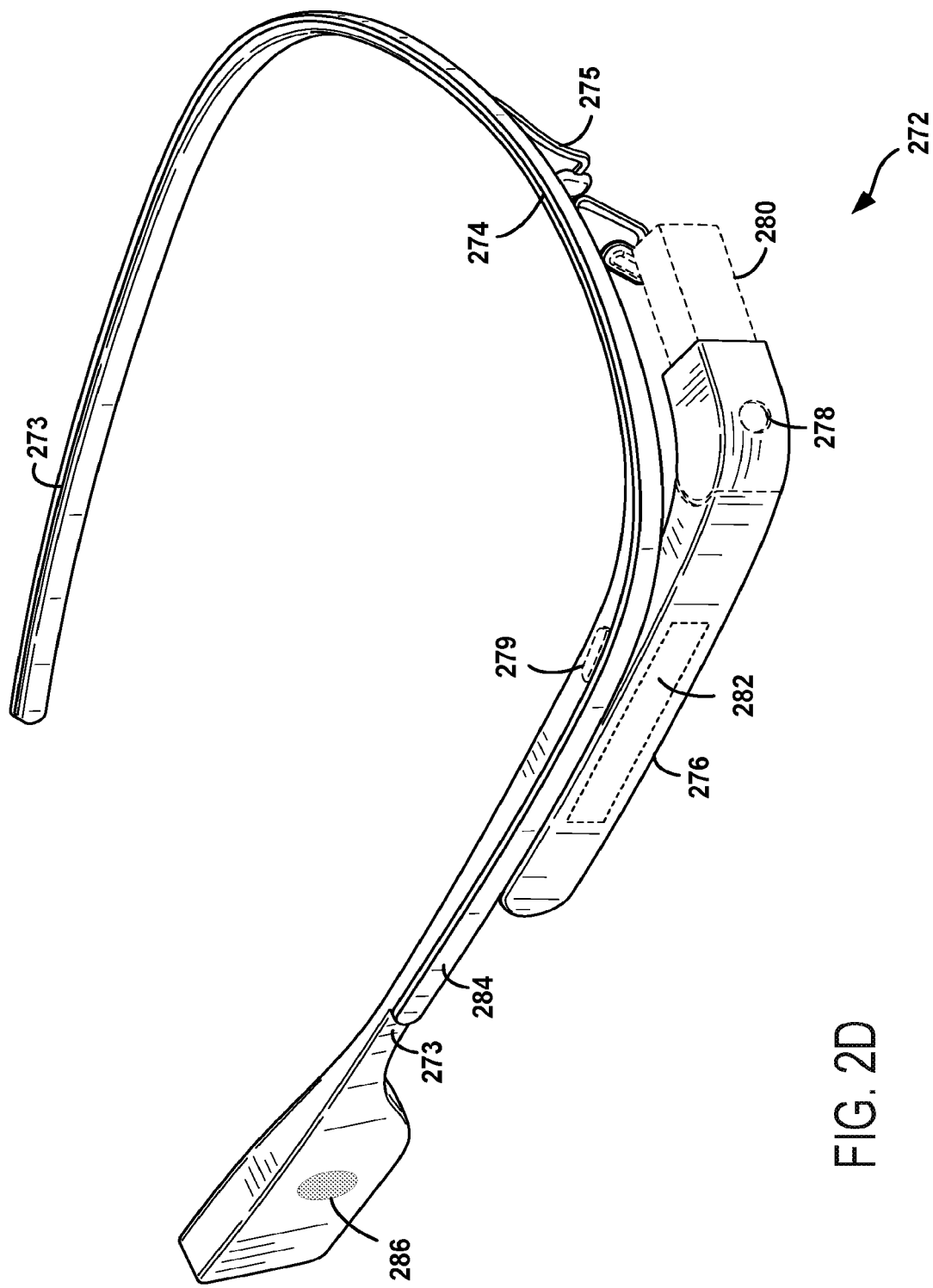
FIG. 2D illustrates another wearable computing system according to an example embodiment.

FIG. 2D illustrates another wearable computing system according to an example embodiment, which takes the form of a monocular HMD 272. The HMD 272 may include side-arms 273, a center frame support 274, and a bridge portion with nosepiece 275. In the example shown in FIG. 2D, the center frame support 274 connects the side-arms 273. The HMD 272 does not include lens-frames containing lens elements. The HMD 272 may additionally include a component housing 276, which may include an on-board computing system (not shown), an image capture device 278, and a button 279 for operating the image capture device 278 (and/or usable for other purposes). Component housing 276 may also include other electrical components and/or may be electrically connected to electrical components at other locations within or on the HMD. HMD 272 also includes a BCT 286.

The HMD 272 may include a single display 280, which may be coupled to one of the side-arms 273 via the component housing 276. In an example embodiment, the display 280 may be a see-through display, which is made of glass and/or another transparent or translucent material, such that the wearer can see their environment through the display 280. Further, the component housing 276 may include the light sources (not shown) for the display 280 and/or optical elements (not shown) to direct light from the light sources to the display 280. As such, display 280 may include optical features that direct light that is generated by such light sources towards the wearer's eye, when HMD 272 is being worn.

In a further aspect, HMD 272 may include a sliding feature 284, which may be used to adjust the length of the side-arms 273. Thus, sliding feature 284 may be used to adjust the fit of HMD 272. Further, an HMD may include other features that allow a wearer to adjust the fit of the HMD, without departing from the scope of the invention.

Figure 2E:
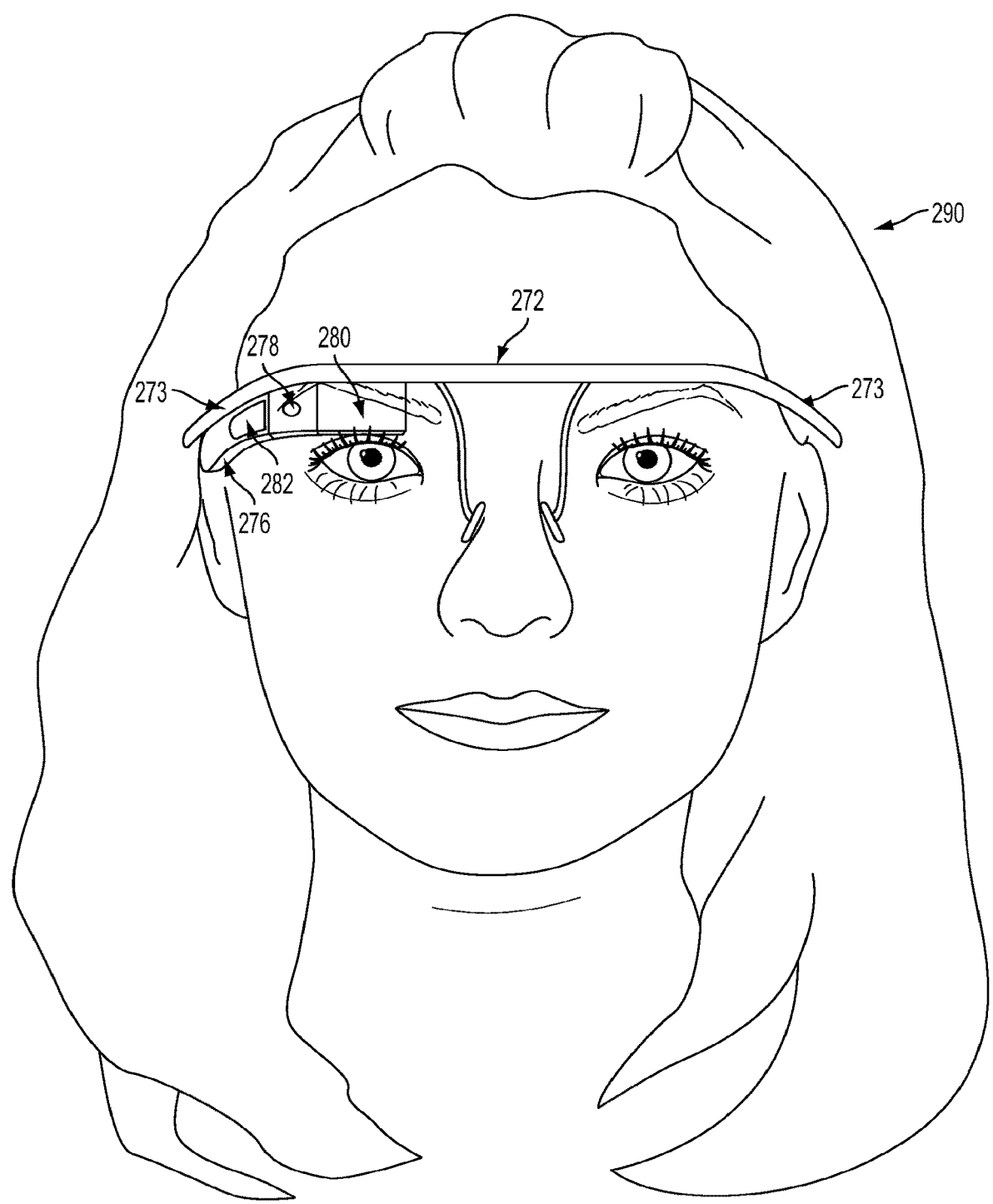
FIGS. 2E to 2G are simplified illustrations of the wearable computing system shown in FIG. 1D, being worn by a wearer.
Figure 2F:
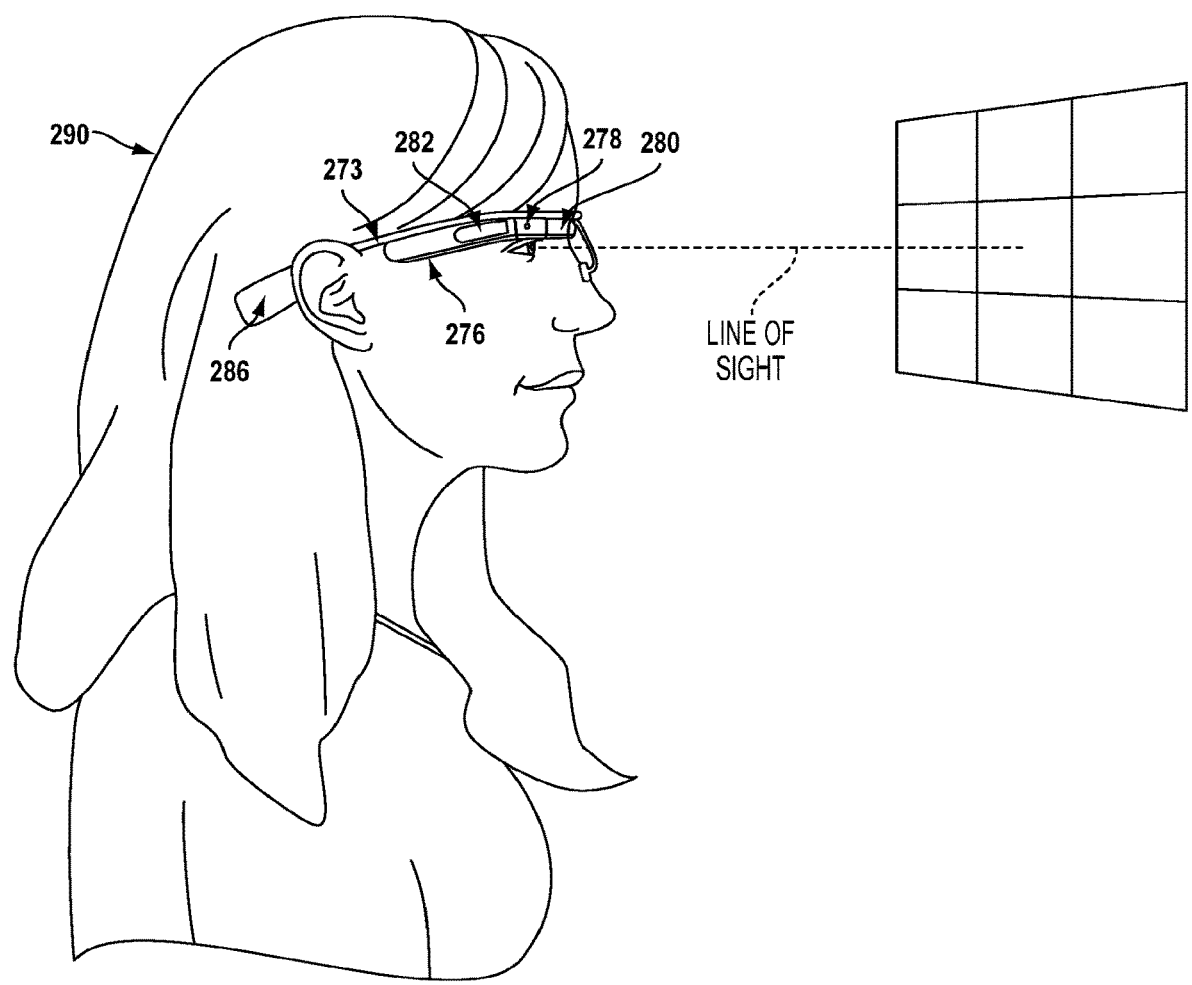
Figure 2G:
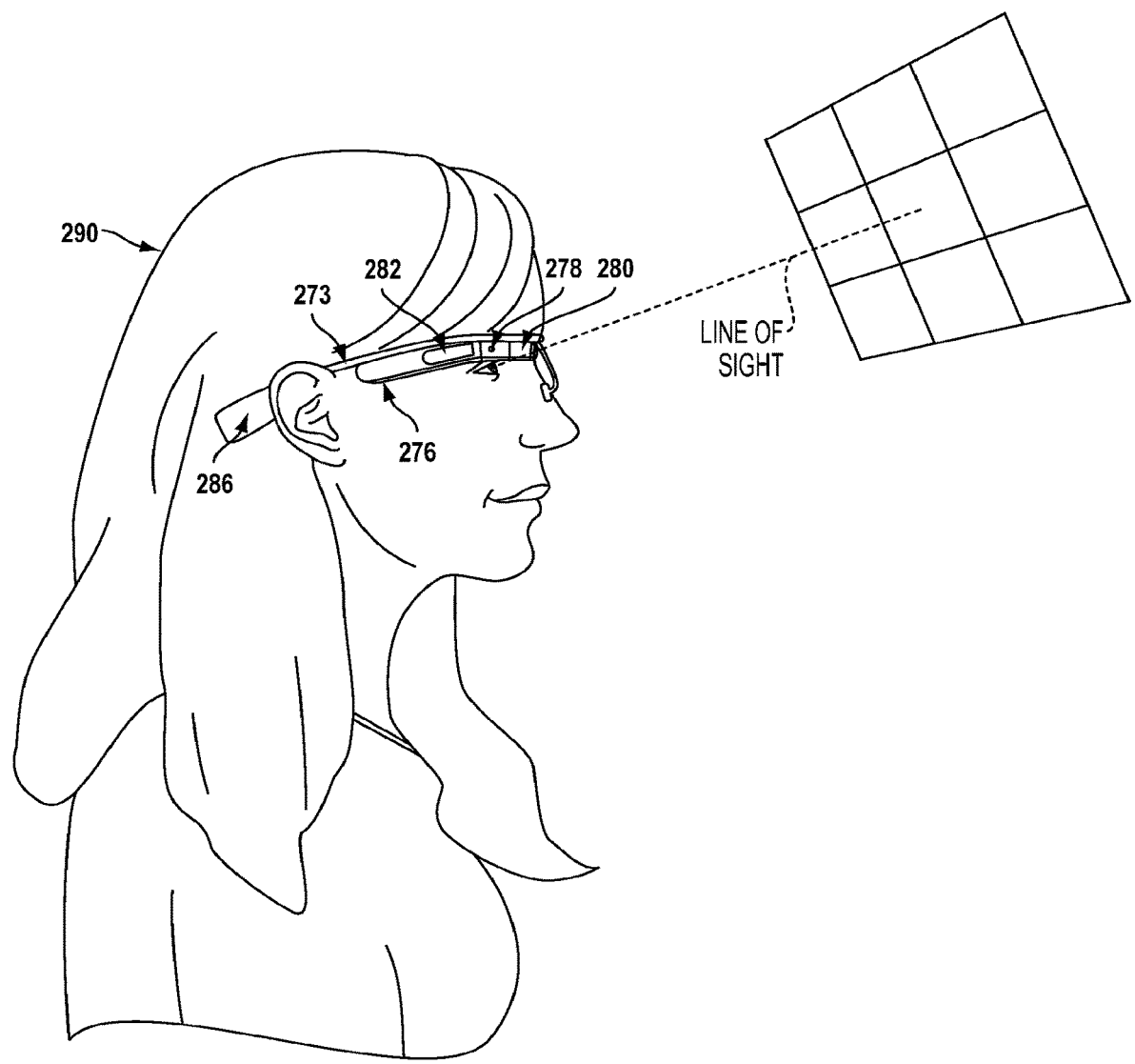

FIGS. 2E to 2G are simplified illustrations of the HMD 272 shown in FIG. 2D, being worn by a wearer 290. As shown in FIG. 2F, when HMD 272 is worn, BCT 286 is arranged such that when HMD 272 is worn, BCT 286 is located behind the wearer's ear. As such, BCT 286 is not visible from the perspective shown in FIG. 2E.

In the illustrated example, the display 280 may be arranged such that when HMD 272 is worn, display 280 is positioned in front of or proximate to a user's eye when the HMD 272 is worn by a user. For example, display 280 may be positioned below the center frame support and above the center of the wearer's eye, as shown in FIG. 2E. Further, in the illustrated configuration, display 280 may be offset from the center of the wearer's eye (e.g., so that the center of display 280 is positioned to the right and above of the center of the wearer's eye, from the wearer's perspective).

Configured as shown in FIGS. 2E to 2G, display 280 may be located in the periphery of the field of view of the wearer 290, when HMD 272 is worn. Thus, as shown by FIG. 2F, when the wearer 290 looks forward, the wearer 290 may see the display 280 with their peripheral vision. As a result, display 280 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 280 is located as shown, the wearer 290 may view the display 280 by, e.g., looking up with their eyes only (possibly without moving their head). This is illustrated as shown in FIG. 2G, where the wearer has moved their eyes to look up and align their line of sight with display 280. A wearer might also use the display by tilting their head down and aligning their eye with the display 280.

Figure 3A:
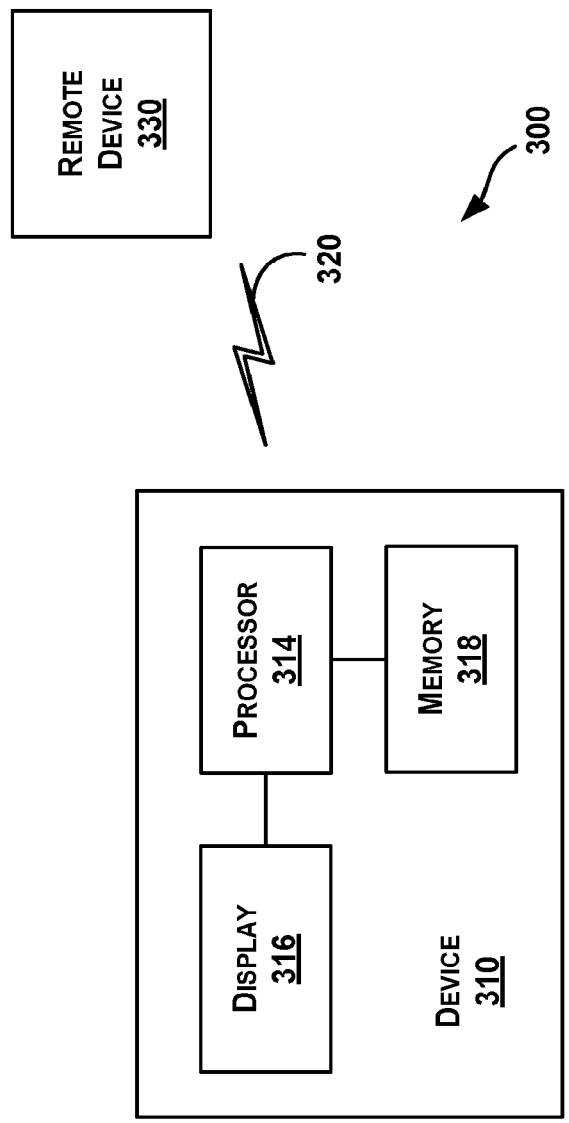
FIG. 3A is a simplified block diagram of a computing device according to an example embodiment.

FIG. 3A is a simplified block diagram a computing device 310 according to an example embodiment. In an example embodiment, device 310 communicates using a communication link 320 (e.g., a wired or wireless connection) to a remote device 330. The device 310 may be any type of device that can receive data and display information corresponding to or associated with the data. For example, the device 310 may take the form of or include a head-mountable display, such as the head-mounted devices 202, 252, or 272 that are described with reference to FIGS. 2A to 2G.

The device 310 may include a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, head-mountable display, tablet computing device, etc., that is configured to transmit data to the device 310. The remote device 330 and the device 310 may contain hardware to enable the communication link 320, such as processors, transmitters, receivers, antennas, etc.

Further, remote device 330 may take the form of or be implemented in a computing system that is in communication with and configured to perform functions on behalf of client device, such as computing device 310. Such a remote device 330 may receive data from another computing device 310 (e.g., an HMD 202, 252, or 272 or a mobile phone), perform certain processing functions on behalf of the device 310, and then send the resulting data back to device 310. This functionality may be referred to as "cloud" computing.

In FIG. 3A, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 3B:
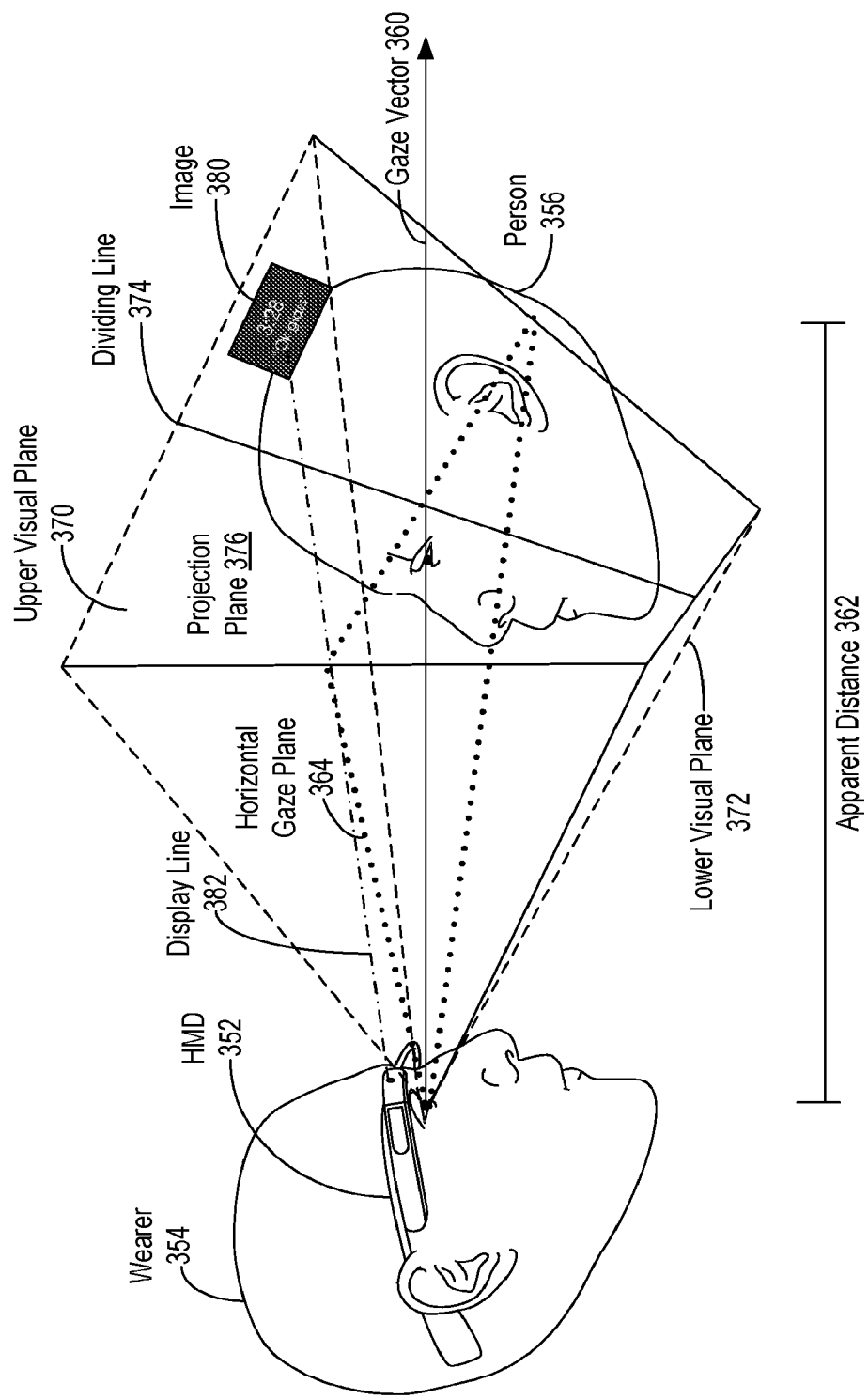
FIG. 3B shows a projection of an image by a head-mountable device, according to an example embodiment.

FIG. 3B shows an example projection of UI elements described herein via an image 380 by an example head-mountable device (HMD) 352, according to an example embodiment. Other configurations of an HMD may be also be used to present the UI described herein via image 380. FIG. 3B shows wearer 354 of HMD 352 looking at an eye of person 356. As such, wearer 354's gaze, or direction of viewing, is along gaze vector 360. A horizontal plane, such as horizontal gaze plane 364 can then be used to divide space into three portions: space above horizontal gaze plane 364, space in horizontal gaze plane 364, and space below horizontal gaze plane 364. In the context of projection plane 376, horizontal gaze plane 360 appears as a line that divides projection plane into a subplane above the line of horizontal gaze plane 360, a subplane a subspace below the line of horizontal gaze plane 360, and the line where horizontal gaze plane 360 intersects projection plane 376. In FIG. 3B, horizontal gaze plane 364 is shown using dotted lines.

Additionally, a dividing plane, indicated using dividing line 374 can be drawn to separate space into three other portions: space to the left of the dividing plane, space on the dividing plane, and space to right of the dividing plane. In the context of projection plane 376, the dividing plane intersects projection plane 376 at dividing line 374. Thus the dividing plane divides projection plane into: a subplane to the left of dividing line 374, a subplane to the right of dividing line 374, and dividing line 374. In FIG. 3B, dividing line 374 is shown as a solid line.

Humans, such as wearer 354, when gazing in a gaze direction, may have limits on what objects can be seen above and below the gaze direction. FIG. 3B shows the upper visual plane 370 as the uppermost plane that wearer 354 can see while gazing along gaze vector 360, and shows lower visual plane 372 as the lowermost plane that wearer 354 can see while gazing along gaze vector 360. In FIG. 3B, upper visual plane 370 and lower visual plane 372 are shown using dashed lines.

The HMD can project an image for view by wearer 354 at some apparent distance 362 along display line 382, which is shown as a dotted and dashed line in FIG. 3B. For example, apparent distance 362 can be 1 meter, four feet, infinity, or some other distance. That is, HMD 352 can generate a display, such as image 380, which appears to be at the apparent distance 362 from the eye of wearer 354 and in projection plane 376. In this example, image 380 is shown between horizontal gaze plane 364 and upper visual plane 370; that is image 380 is projected above gaze vector 360. In this example, image 380 is also projected to the right of dividing line 374. As image 380 is projected above and to the right of gaze vector 360, wearer 354 can look at person 356 without image 380 obscuring their general view. In one example, the display element of the HMD 352 is translucent when not active (i.e. when image 380 is not being displayed), and so the wearer 354 can perceive objects in the real world along the vector of display line 382.

Other example locations for displaying image 380 can be used to permit wearer 354 to look along gaze vector 360 without obscuring the view of objects along the gaze vector. For example, in some embodiments, image 380 can be projected above horizontal gaze plane 364 near and/or just above upper visual plane 370 to keep image 380 from obscuring most of wearer 354's view. Then, when wearer 354 wants to view image 380, wearer 354 can move their eyes such that their gaze is directly toward image 380.

III. Illustrative Methods

Figure 4A:
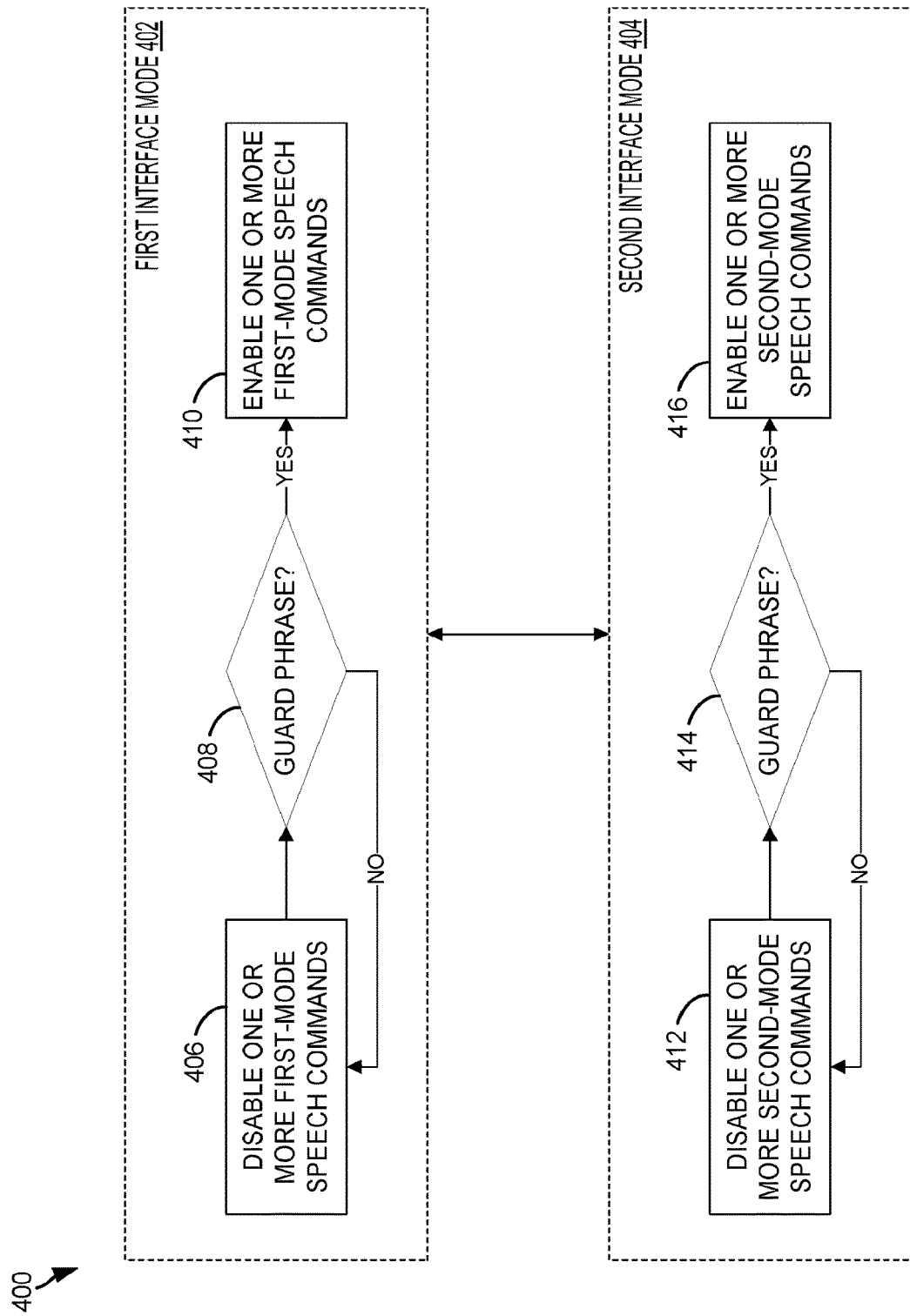
FIG. 4A and FIG. 4B are flow charts illustrating methods, according to example embodiments.

FIG. 4A is a flow chart illustrating a method 400, according to an example embodiment. Some functions of the method may be implemented while an HMD is operating in first interface mode 402, while other functions may be implemented while an HMD is operating in second interface mode 404.

Referring again to FIG. 4A, method 400 involves a computing device, such as an HMD or component thereof, operating in a first interface mode 402. Operation in the first interface mode 402 involves initially disabling one or more first-mode speech commands, as shown by block 406. Further, the HMD may listen for a guard phrase, as shown by block 408. If the guard phrase is detected, then the HMD responds by enabling the one or more first-mode speech commands, as shown by block 410. However, as long the guard phrase is not detected, the HMD the first-mode speech commands remain disabled.

At a different point in time, method 400 involves operating in the second interface mode 404, instead of the first interface mode 402. Operation in the second interface mode 404 involves initially disabling one or more second-mode speech commands as shown by block 412. Further, in the second interface mode 404, the HMD may listen for the same guard phrase as the HMD listened for in the first interface mode 402, as shown by block 414. If the guard phrase is detected, then the HMD may respond by enabling the second-mode speech command, as shown by block 416. However, as long the guard phrase is not detected, the second-mode speech command remains disabled.

In the illustrated embodiment, the HMD can switch directly back and forth between the first interface mode 402 and the second interface mode 404. It should be understood, however, that it is possible for the HMD to necessarily or optionally switch to one or more other interface modes in order to reach the second interface mode 404 from the first interface mode 402, and vice versa. Further, the HMD may switch between the first interface mode 402 and one or more other interface modes, and/or may switch between the second interface mode 404 and one or more other interface modes.

Herein, an interface mode may specify a certain way of interpreting input data received via user-input interfaces, such as microphone(s), touchpad(s) or touchscreen(s), sensor(s) arranged to detect gestures in the air, sensors arranged to provide data indicative of head movement (e.g., accelerometer(s), gyroscope(s), and/or magnetometers), an eye-tracking or gaze-tracking system configured to detect eye gestures and/or movement (e.g., winks, blinks, and/or directional movements of the eye), a keyboard, and/or a mouse, among other possibilities. A particular interface mode may also correspond to particular way of receiving input data and/or assisting the user in providing input data that is appropriate for the mode, such as a graphical user-interface (GUI) that is designed to receive certain types of input data and/or to suggest what input data and/or operations are possible in the interface mode.

In an example embodiment, a given interface mode may specify certain voice commands that are available while in the given interface mode. A voice command that is available in a certain interface mode may or may not be immediately usable when the HMD switches to the interface mode. In particular, when an HMD switches to a new interface mode, an available voice command for the interface mode may, by default, be disabled. Accordingly, the user may be required to enable the voice command. In an example embodiment, at least the first and second interface modes each specify voice commands that can be enabled in the respective mode. However, there may be other interface modes that do not provide for any voice commands. Alternatively, in some embodiments, there may be voice commands available in every interface mode of the HMD.

To implement an interface mode in which voice commands are available, an HMD may utilize "hotword" models. A hotword process may be program logic that is executed to listen for certain voice or speech commands in an incoming audio stream. Accordingly, when the HMD begins operating in the first interface mode 402, the HMD may load a hotword process for the guard phrase in order to listen for a guard phrase. Then, when the HMD detects the guard phrase (e.g., at block 408), the HMD may responsively load a hotword process or models for the one or more first-mode speech commands (e.g., at block 410). Note that in some cases, there may be a single hotword process for each speech command. In other cases, a single hotword process may be loaded to listen for two or more speech commands.

In a further aspect, there may be a particular speech command or another type of user command that allows the user to switch from the portion of the UI associated with the first interface mode to the portion of the UI associated with the second interface mode. For example, during operation in the first interface mode 402, the HMD may detect the guard phrase followed by one of the first-mode speech commands and responsively switch to the second interface mode 404. In some implementations, the first interface mode 402 may correspond to a home-screen interface, and the one or more first-mode speech commands may correspond to one or more actions that can be initiated via the home-screen interface. Further, one of the one or more first-mode speech commands may be a speech command that can be spoken to start recording a video. As such, to cause the HMD to start recording a video, the user may say the guard phrase followed by the speech command that starts recording the video.

Figure 4B:
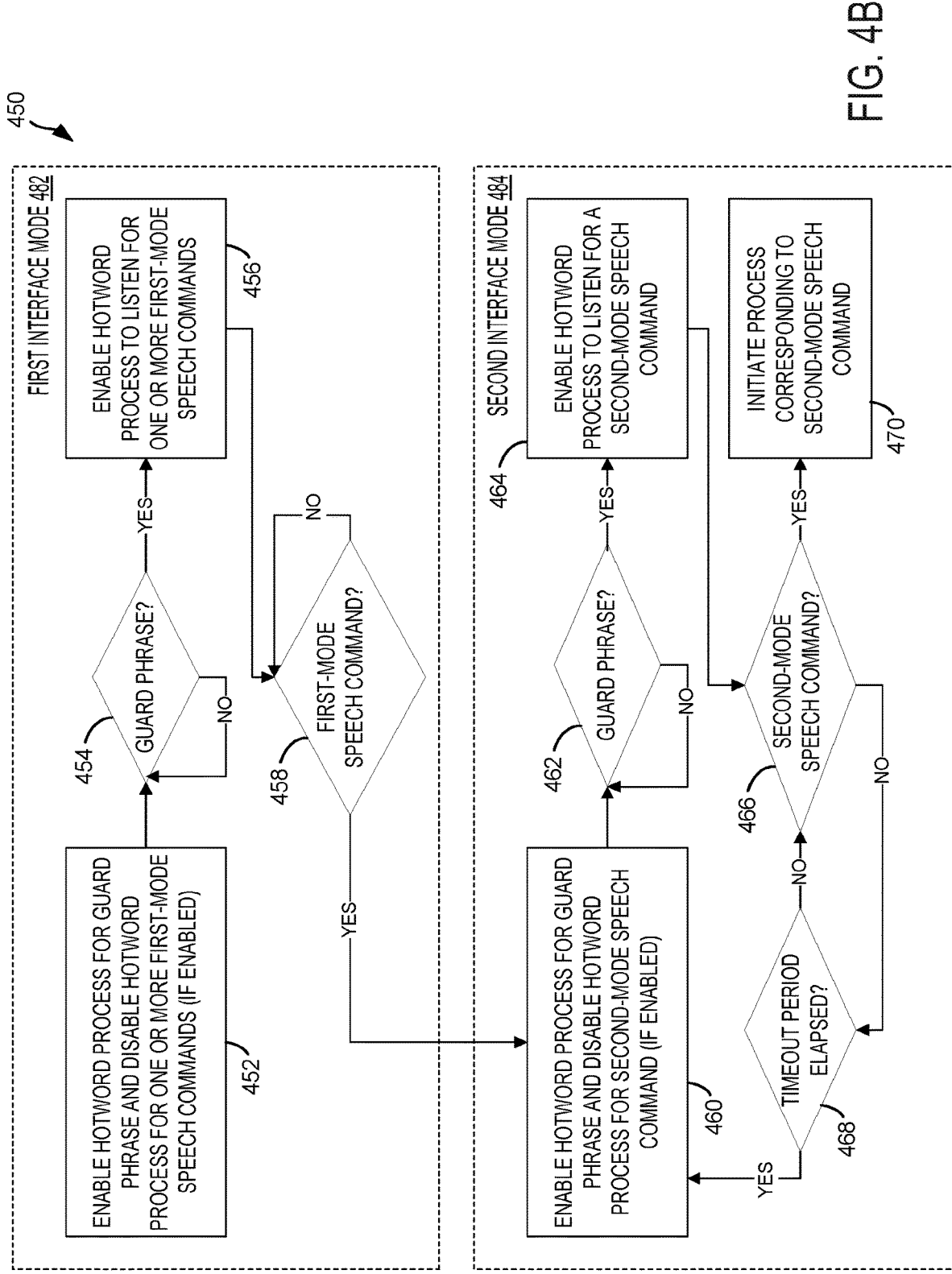

FIG. 4B is a flow chart illustrating another method 450, according to an example embodiment. Method 450 is an embodiment of method 400 in which hotword processes are used to detect the multi-mode guard phrase and mode-specific speech commands in the first and second interface modes 482 and 484. Further, in method 450 a time-out process is added to the second interface mode 484 as an additional protection against false-positive detections of speech commands.

Referring to FIG. 4B in greater detail, when an HMD begins operating in the first interface mode 482, the HMD enables a hotword process for the guard phrase (if it is disabled at the time), and disables the hotword process for the first-mode speech commands (if it is enabled at the time), as shown by block 452. The hotword process for the guard phrase is then used to listen for the guard phrase, as shown by block 454. If the guard phrase is detected, then the HMD enables the hotword process for one or more first-mode speech commands, as shown by block 456. The hotword process for the one or more first-mode speech commands is then used to listen for these speech commands, as shown by block 458.

In the illustrated embodiment, the first-mode speech commands include one speech command that launches a process and/or UI that corresponds to the second interface mode 484. When this particular first-mode speech command is detected, the HMD transitions to the second interface mode 484, as represented by the arrow from block 458 to block 460. Note that while transitions to other interface modes are not shown in FIG. 4B, an HMD might also be configured to transition to other interface modes in response to detecting other first-mode speech commands.

When the HMD begins operating in the second interface mode 484, the HMD enables the hotword process for the guard phrase (if it not already enabled at the time), and disables the hotword process for the second-mode speech command (if it is enabled at the time), as shown by block 460. The hotword process for the guard phrase is again used to listen for the guard phrase, as shown by block 462. If the guard phrase is detected, then the HMD enables the hotword process for the second-mode speech command, as shown by block 464. The hotword process for the second-mode speech command is then used to listen for this speech command, as shown by block 464.

In a further aspect of the second interface mode 484, when the HMD detects the guard phrase, the HMD may also implement a time-out process in an effort to further protect against false-positives. For example, at or near when the HMD detects the guard phrase, the HMD may start a timer. Accordingly, the HMD may then continue to listen for the second-mode speech command, at block 466, for the duration of the timer (which may also be referred to as the "timeout period"). If the HMD detects the second-mode speech command before the timeout period elapses, the HMD initiates a process corresponding to the second-mode speech command, as shown by block 470. However, if the second-mode speech command has not been detected, and the HMD determines at block 468 that the timeout period has elapsed, then the HMD repeats block 460 in order to enable the hotword process for the guard phrase (if it not already enabled at the time), and disable the hotword process for the second-mode speech command.

Note that in an example embodiment, there may only be one hotword process for speech commands available at a given point in time (i.e., the hotword process for speech commands that are available in the current interface). In such an embodiment, the hotword process for the first-mode speech commands will already be disabled when the HMD switches to the first-interface mode from another interface mode. Thus, if the hotword process for the first-mode speech commands is already disabled when the HMD carries out block 452, then the HMD may not need to take any action to disable the hotword process for the first-mode speech commands. Similarly, if the hotword process for the second-mode speech commands is already disabled when the HMD carries out block 460, then the HMD may not need to take any action to disable the hotword process for the second-mode speech commands.

Further, in some embodiments, the HMD may enable the hotword process for the guard phrase so long as some speech commands are available in whichever interface mode the HMD is operating in. Accordingly, the hotword process for the guard phrase may remain enabled as the HMD switches between interface modes where voice commands are provided. For instance, the hotword process for the guard phrase may be enabled in the first interface mode 482, and may remain when the HMD switches from the first interface mode 482 to the second interface mode 484. Thus, if the hotword process for the guard phrase is already enabled when the HMD carries out block 452 and/or block 460, then the HMD may not need to take any action to enable the hotword process for the guard phrase.

In some embodiments, the hotword process for guard phrase may be kept enabled after guard phrase detected, at same time as hotword process for speech commands is enabled (or alternatively hotword process for speech commands may simply include guard phrase and speech commands). Further in some cases, the hotword process for the guard phrase may be permanently loaded, such that the HMD is always listening for the guard phrase. Alternatively, the HMD may disable the hotword process for the guard phrase when the hotword process for speech commands is enabled and/or at other times when the HMD does not need to listen for the guard phrase (e.g., when the HMD is operating in an interface mode where no speech commands are available and/or where available speech commands are always enabled).

In a further aspect, an HMD may also provide visual cues for a voice UI. As such, when the hotword process for the guard phrase is enabled, such as at block 452 or block 460, method 450 may further involve the HMD displaying a visual cue that is indicative of the guard phrase. Additionally or alternatively, after the guard phrase is detected in a given interface mode, method 450 may further involve the HMD displaying one or more visual cues corresponding to the one or more speech commands that have been enabled. For example, at block 456, the HMD may display visual cues that correspond to the first-mode speech commands, and at block 464, the HMD may display a visual cue that corresponds to the second-mode speech commands. Other examples are also possible.

Note that in method 450, the second interface mode 484 uses the guard phrase to protect a single voice command. In some ways, this may be regarded as counterintuitive, as it might be perceived as an extra step that could annoy a user. However, as will be described below in greater detail, a carefully chosen guard command may alleviate the perception of a guard phrase as an extra step. More specifically, in some embodiments, the guard phrase may be selected such that a user may perceive the guard phrase and a subsequent speech command as a single command, even though the HMD is detecting them separately.

IV. Illustrative Device Functionality

Figure 5B:
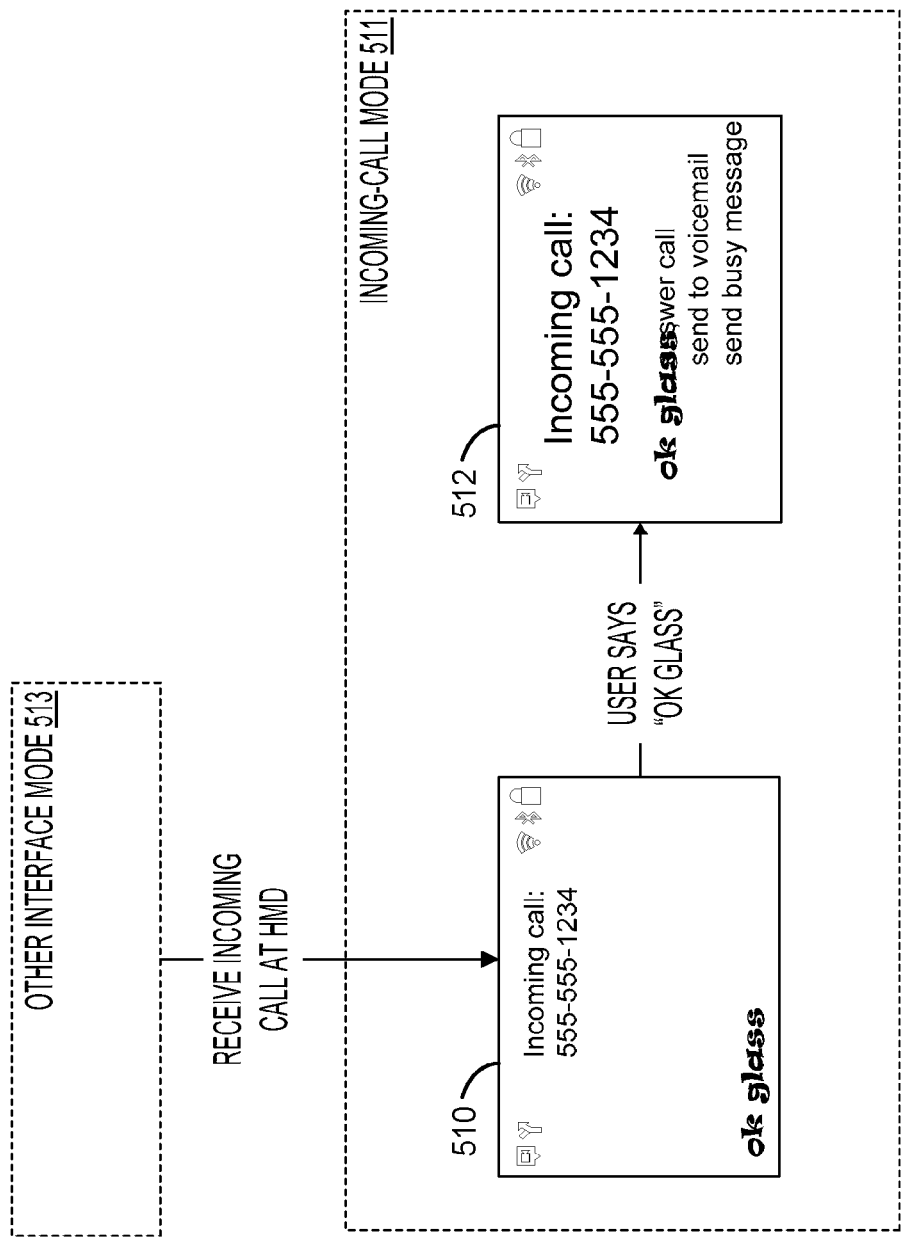
Figure 5C:
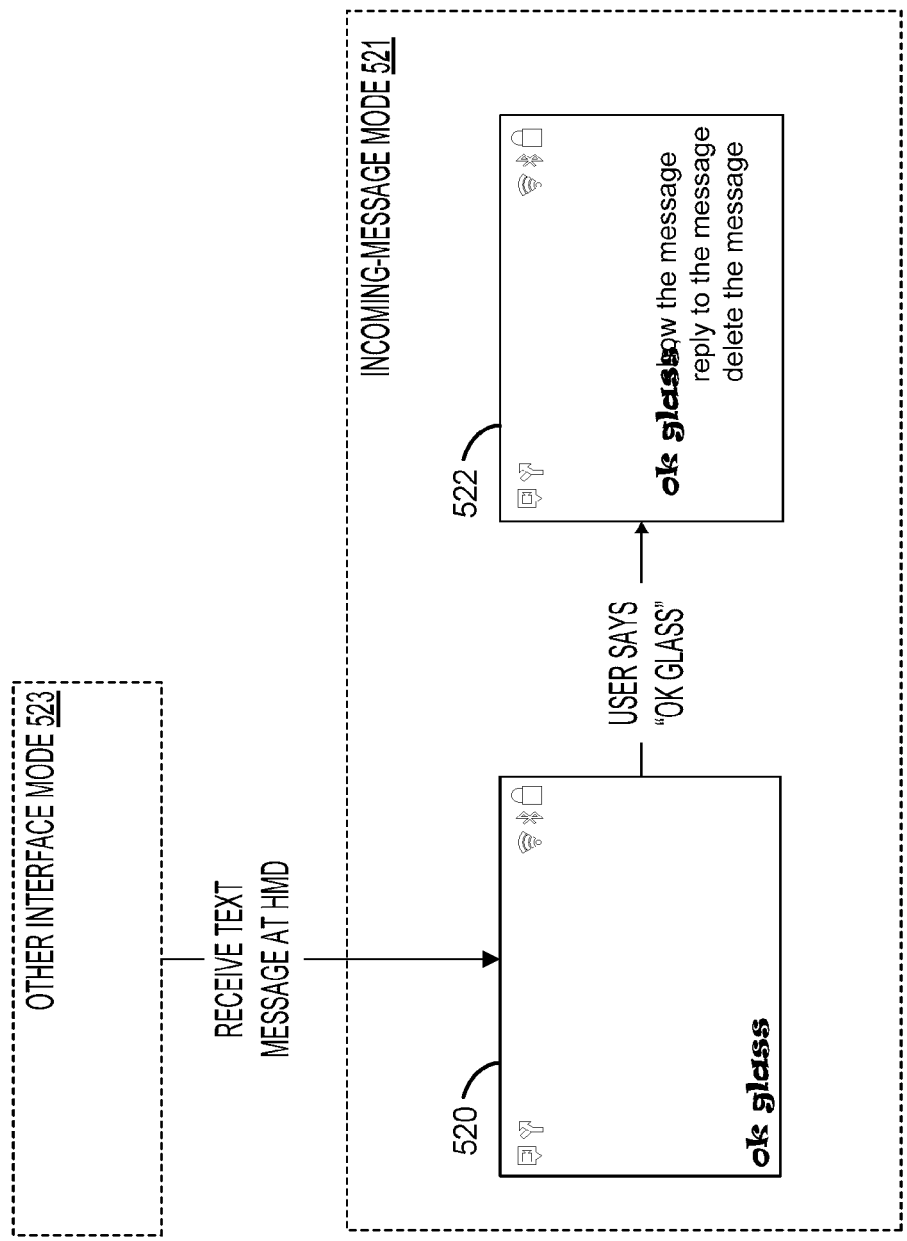

FIGS. 5A to 5C illustrate applications of a multi-mode guard phrase, according to example embodiments. In order to provide a voice UI with a multi-mode guard phrase, these applications may utilize methods such as those described in reference to FIGS. 4A and 4B. However, other techniques may also be used to provide the UI functionality shown in FIGS. 5A to 5C.

FIG. 5A shows an application that involves a home-screen interface 501 and a voice-recording interface 503. More specifically, an HMD may operate in a home-screen mode 501, where certain speech commands can be enabled by saying the guard phrase "ok glass." This may be implemented by loading a hotword process that listens only for the phrase "ok glass." While in the home-screen mode 501, the HMD may display "ok glass" as a visual cue that the guard phrase can be used to enable speech interaction, as shown by screen view 500.

When the HMD detects that the wearer has said "ok glass," the HMD may enable the speech commands for the home-screen mode 501. To do so, the HMD may load a hotword process that listens for the speech commands that are useful in home-screen mode 501. Further, the HMD may display visual cues indicating the speech commands that have been enabled. For example, as shown by screen view 502, the HMD may display visual cues corresponding to speech commands, such as "navigate to", "take a photo", "record a video", "send message to", etc.

After enabling the speech commands in home-screen mode 501, the HMD may switch to a different interface mode in response to one of the speech commands. For instance, as shown in FIG. 5A, if the user says "record a video," the HMD may switch from home-screen mode 501 to a video-recording mode 503. Further, in some embodiments, different speech commands could be used to initiate different functions and/or launch other applications, which may each have their own corresponding interface mode. As examples, a "send message to" command could switch to a text-message or e-mail interface mode, and a "make a call" command could switch to a phone-call interface mode. Other examples are also possible.

When the HMD switches to video-recording mode 503, the HMD may launch a camera application and automatically start recording video. Further, a hotword process for video-recording mode 503 may provide for a single speech command to stop the video recording, which is also guarded by the "ok glass" guard phrase. To indicate that a speech command can be enabled, the HMD may display a visual cue. For example, in screen view 504, the HMD displays the guard phrase, "ok glass," to indicate that the user can enable voice interaction by saying "ok glass." Other examples are also possible.

When the HMD is in video-recording mode 503, and detects that the wearer has said "ok glass," the HMD may enable the hotword process that listens for the single speech command that is available in the video-recording mode 503; e.g., a "stop recording" speech command. Further, the HMD may provide a visual cue that the "stop recording" speech command can be used. For example, the HMD may update the display so that "stop recording" follows "ok glass," as shown by screen view 506. The wearer can then say "stop recording" to cause the camera application to cease recording video (as shown in screen view 508, where an indicator in the lower right may stop blinking to indicate that video is not being captured).

As noted above, some interface modes may provide an additional guard against false-positive detection of speech commands by utilizing a timeout process to disable speech command(s) when no speech command is detected within a certain period of time after detecting the guard phrase. Further, the implementation of a time-out process may vary between modes.

For instance, consider the example in FIG. 5A with a home-screen mode and a video-recording mode. It might be the case that users typically go to the home screen with a specific task in mind, and thus are only there for a short time (e.g., 15 seconds or less). However, it might also be the case that users typically record video for a longer period of time (e.g., 1 to 10 minutes). If a user typically stays on the home screen for less time than the user spends recording a video, the probability of incorrectly concluding the user has said "ok glass" while at the home screen may be less than the probability of such a false positive while recording video. Accordingly, a shorter time-out period may be implemented in the video-recording mode (e.g., 5 seconds) and a longer time-out period (or possibly no time-out period) may be implemented in the home-screen mode.

In yet a further aspect, the visual cues for the same guard phrase may vary between interface modes. Additionally or alternatively, the visual cues for enabled speech commands may be formatted for display in different ways, depending upon the particular interface mode. For instance, a home screen may serve as a launch point to get to other modes, and thus it may be acceptable for visual cues to be displayed such that they take up more space and/or are more central in the HMD wearer's field of view. During video recording, however, it may be desirable for the visual cues to be less obtrusive, so that the wearer can see through the display to their environment. In particular, since the HMD may not have an actual viewfinder for a point-of-view (POV) camera, the wearer may assume that there field of view is roughly what the POV is capturing on video, which makes an obstructed view through the viewfinder desirable.

Thus, in home-screen mode 501, the "ok glass" visual cue may be larger and centrally placed, as shown in screen view 500. Further, the visual cues for speech commands shown in screen view 502 are displayed in a menu form that occupies a significant amount of the display. In video-recording mode 503, however, the visual cues for "ok glass" guard phrase and the "stop recording" speech command are smaller and displayed at the lower edge of the display, as shown in screen views 504 and 506. (Note that the locations may vary; for instance, the visual cues for the "ok glass" guard phrase and the "stop recording" could also be displayed at the upper edge of the display, or elsewhere.)

Note that if the user thinks of "glass" as the name or type of their device, then the phrase "ok glass" may be a particularly good choice for a guard phrase. In particular, the phrase "ok glass" may feel like something the user would say in order to address the device, in the same manner as they might address a person to whom they are speaking. As such, while the computing device may treat the guard phrase and a subsequent speech commands as separate voice commands, the combination of the guard phrase and a speech command may feel to the user like a single command in which they address their computing device and tell the device what they want it to do. For instance, in the home-screen mode 501, the user may say "ok glass, record a video," which may feel to the user like a single voice command, even though the hotword process to detect "record a video" is not loaded until the user says "ok glass." Thus, with the use of a guard phrase such as "ok glass," the user may not even be aware that the guard phrase is required, or at least may find the need to say a guard phrase less cumbersome.

Other guard phrases may enhance the user experience in a similar way as "ok glass" can. Generally, any guard phrase that a user may perceive as addressing or conversing with their device could similarly enhance the user experience. For example, a guard phrase that includes a name for the device, which may be predefined or created by the user, may have a similar effect on the user experience. Other examples are also possible.

In a further aspect, an example computing device may be configured to remove a guard phrase, such as "ok glass", and/or to remove a "stop recording" speech command, from the audio portion of a video. More specifically, when a user says "ok glass, stop recording," or something to that effect, in order to stop recording a video, the audio portion of the video may include the speech command. However, in many instances, the user may not want the speech command to be included in the audio. Accordingly, an HMD may be configured to at least partially remove the guard phrase and/or the stop-recording command from the audio portion of a captured video.

The HMD may use various techniques in an effort to remove the guard phrase and/or the stop-recording command from the audio portion of a captured video. For example, the HMD could simply trim the portion of the video that includes the guard phrase and/or the stop-recording command. The HMD could also trim just the audio, without trimming the entire video (e.g., so that the video is silent during the time when the user says the guard phrase and/or the stop-recording command).

As another example, the HMD could use a technique such as spectral subtraction to remove the guard phrase and/or the stop-recording command from the video, without trimming the audio. For example, the HMD may store a previous instance or instances when the user says the guard phrase and/or the stop-recording command, and create a model speech signals for the guard phrase and/or the stop-recording command. The HMD may then subtract the model speech signals from the audio portion of a video to at least partially remove the guard phrase and/or the stop-recording command from the audio (while hopefully leaving a significant portion of other audio intact). Other techniques are also possible.

Many other interface modes with guard-phrase protected speech commands are possible. For example, FIG. 5B shows an application that involves an incoming-call mode 511 and another interface mode 513. In some cases, the other interface mode 513 may be the home-screen mode 501 described in reference to FIG. 5A; but in other cases, it could be a different interface mode. In any case, when the HMD is operating in the other interface mode 513 and receives an incoming call, the HMD may responsively switch to incoming-call mode 511.

There may be one or more speech commands available in the incoming-call mode 511, which can be enabled via the "ok glass" guard phrase. To indicate that a speech command can be enabled, the HMD may display visual cue. Thus, in the illustrated example, the HMD displays the guard phrase "ok glass," as shown by screen view 510. When the HMD detects speech that includes "ok glass," the HMD may display visual cues to indicate the particular speech commands that have been enabled. For example, in the illustrated embodiment, the HMD display visual cues indicating that the speech commands "answer call," "send to voicemail," and "send busy message," can be utilized, as shown by screen view 512.

FIG. 5C provides another example of an interface mode with guard-phrase protected speech commands. In particular, FIG. 5C shows an application that involves an incoming-message mode 521 and another interface mode 523. In some cases, the other interface mode 523 may be the home-screen mode 501 described in reference to FIG. 5A; but in other cases, it could be a different interface mode. In any case, when the HMD is operating in the other interface mode 523 and receives an incoming message, such as a text message or an e-mail, the HMD may responsively switch to incoming-message mode 521.

There may be one or more speech commands available in the incoming-message mode 521, which can be enabled via the "ok glass" guard phrase. To indicate that the one or more speech commands can be enabled, the HMD may display one or more visual cues. Thus, in the illustrated example, the HMD displays the guard phrase "ok glass," as shown by screen view 520. Then, when the HMD detects speech that includes "ok glass," the HMD may display visual cues to indicate the particular speech commands that have been enabled. In the illustrated embodiment, the HMD display visual cues indicating that the speech commands "show the message," "reply to the message," and "delete the message," can be utilized, as shown by screen view 522.

V. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method implemented by one or more processors associated with a head mounted display, the method comprising:
   transitioning the head mounted display into a second interface mode from a first interface mode in response to receiving a spoken utterance from a user captured by at least one sensor of the head mounted display,
      wherein the first interface mode has a first set of supported spoken commands and the second interface mode has a second set of supported spoken commands, the first set of supported spoken commands different than the second set of supported spoken commands;
      wherein the second interface mode is operable to process the second set of supported spoken commands specific to the second interface mode;
   enabling, in response to transitioning the head mounted display into the second interface mode, the second set of supported spoken commands that are specific to the second interface mode,
      wherein the second interface mode corresponds to a current state of a user interface of the head mounted display; and
      wherein the second interface mode and the first interface mode are each one of multiple interface modes each corresponding to alternate states of the user interface of the head mounted display, each of the multiple interface modes having a different set of supported spoken commands;
   while the head mounted display is in the second interface mode, and responsive to enabling the second set of supported spoken commands;
   receiving audio data captured by at least one audio sensor of the head mounted display;
   analyzing the audio data to determine whether any of the second set of supported spoken commands that are specific to the second interface mode, are included in the audio data;
   determining whether the audio data contains a given spoken command, of the second set of supported spoken commands and that the audio data is received within a threshold period of time; and
   causing, in response to determining the audio data being received within the threshold period of time contains the given spoken command, performance of one or more actions, via the head mounted display, that correspond to the given spoken command.

2. The method of claim 1, further comprising:
   while the head mounted display is in the second interface mode and while the second set of supported spoken commands are enabled:
      determining the threshold period of time has lapsed; and
      in response to determining the threshold period of time has lapsed, disabling the second set of supported spoken commands that are specific to the second interface mode.

3. The method of claim 2, further comprising:
   while the head mounted display is in the second interface mode and while the second set of supported spoken commands are disabled:
      in response to determining the given spoken command, of the second set of supported spoken commands, is included in the audio data:
         refraining from performing one or more of the actions that correspond to the given spoken command.

4. The method of claim 3, further comprising:
   subsequent to refraining from performing one or more of the actions that correspond to the given spoken command:
      receiving additional audio data captured by the at least one audio sensor of the head mounted display; and
      re-enabling the second set of supported spoken commands that are specific to the second interface mode.

5. The method of claim 1, further comprising:
   while the head mounted display is in the second interface mode and while the second set of supported spoken commands are enabled:

displaying a visual cue for one or more of the second set of supported spoken commands via a display of the head mounted display.

6. The method of claim 5, further comprising:
while the head mounted display is in the second interface mode and while the second set of supported spoken commands are enabled:
determining the threshold period of time has lapsed; and
in response to determining the threshold period of time has lapsed, causing the visual cue for the second set of supported spoken commands to be removed from the display of the head mounted display.

7. The method of claim 1,
wherein enabling the second set of supported spoken commands that are specific to the second interface mode comprises loading, at the head mounted display, at least one hotword process for the second set of supported spoken commands; and
wherein analyzing the audio data to determine whether any of the second set of supported spoken commands are included in the audio data comprises analyzing the audio data using the at least one hotword process.

8. The method of claim 1, wherein in addition to the spoken utterance, the at least one sensor of the head mounted display captures preceding audio data, the preceding audio data including at least a predefined guard phrase.

9. The method of claim 1, wherein the threshold period of time is specific to the second interface mode.

10. The method of claim 1, wherein enabling the second set of supported spoken commands is based on a first instance of audio data.

11. The method of claim 1, wherein the head mounted display includes a microphone.

12. The method of claim 1 wherein the first interface mode is a home screen and the second interface mode is a phone.

13. The method of claim 1 wherein the first interface mode is a phone and the second interface mode is a camera.

14. The method of claim 1 wherein head mounted display communicates with at least one computing device remote from the head mounted display.

15. A head mounted display comprising memory and one or more processors configured to execute instructions stored in memory, the instructions operable to:
transition the head mounted display into a second interface mode from a first interface mode in response to receiving a spoken utterance from a user captured by at least one sensor of the head mounted display,
wherein the first interface mode has a first set of supported spoken commands and the second interface mode has a second set of supported spoken commands, the first set of supported spoken commands different than the second set of supported spoken commands
wherein the second interface mode is operable to process the second set of supported spoken commands specific to the second interface mode;
enable, in response to transitioning the head mounted display into the second interface mode, the second set of supported spoken commands that are specific to the second interface mode,
wherein the second interface mode corresponds to a current state of a user interface of the head mounted display; and
wherein the second interface mode and the first interface mode are each one of multiple interface modes each corresponding to alternate states of the user interface of the head mounted display, each of the multiple interface modes having a different set of supported spoken commands;
while the head mounted display is in the second interface mode, and responsive to the second set of supported spoken commands being enabled:
receive audio data captured by at least one audio sensor of the head mounted display;
analyze the audio data to determine whether any of the second set of supported spoken commands that are specific to the second interface mode are included in the audio data;
determine whether the audio data contains a given spoken command, of the second set of supported spoken commands and that the audio data is received within a threshold period of time; and
cause, in response to the determination that the audio data, received within the threshold period of time contains the given spoken command, performance of one or more actions, via the head mounted display, that correspond to the given spoken command.

16. The head mounted display of claim 15, wherein the instructions further comprise instructions to:
while the head mounted display is in the second interface mode and while the second set of supported spoken commands are enabled:
determine the threshold period of time has lapsed; and
in response to determining the threshold period of time has lapsed, disable the second set of supported spoken commands that are specific to the second interface mode.

17. The head mounted display of claim 16, wherein the instructions further comprise instructions to:
while the head mounted display is in the second interface mode and while the second set of supported spoken commands are disabled:
in response to the determination that the given spoken command, of the second set of supported spoken commands, is included in the audio data:
refrain from performing one or more of the actions that correspond to the given spoken command.

18. The head mounted display of claim 17, wherein the instructions further comprise instructions to:
subsequent to refraining from performing one or more of the actions that correspond to the given spoken command:
receive additional audio data captured by the at least one audio sensor of the head mounted display; and
re-enable the second set of supported spoken commands that are specific to the second interface mode.

19. The head mounted display of claim 15, wherein the instructions further comprise instructions to:
while the head mounted display is in the second interface mode and while the second set of supported spoken commands are enabled:
display a visual cue for one or more of the second set of supported spoken commands via a display of the head mounted display.

20. The head mounted display of claim 19, wherein the instructions further comprise instructions to:
while the head mounted display is in the second interface mode and while the second set of supported spoken commands are enabled:
determine the threshold period of time has lapsed; and
in response to determining the threshold period of time has lapsed, cause the visual cue for the second set of supported spoken commands to be removed from the display of the head mounted display.

21. The head mounted display of claim 15,
wherein the instructions to enable the second set of supported commands that are specific to the second interface mode comprise instructions to load, at the head mounted display, at least one hotword process for the second set of supported spoken commands; and
wherein the instructions to analyze the audio data to determine whether any of the second set of supported spoken commands are included in the audio data comprise instructions to analyze the audio data using the at least one hotword process.

22. The head mounted display of claim 15, wherein in addition to the spoken utterance, the at least one sensor of the head mounted display captures preceding audio data, the preceding audio data including at least a predefined guard phrase.

23. A non-transitory computer-readable storage medium comprising instructions executable by at least one processor, the instructions operable to:
transition a head mounted display into a second interface mode from a first interface mode in response to receiving a spoken utterance from a user captured by at least one sensor of the head mounted display,
wherein the first interface mode has a first set of supported spoken commands and the second interface mode has a second set of supported spoken commands, the first set of supported spoken commands different than the second set of supported spoken commands;
wherein the second interface mode is operable to process the second set of supported spoken commands specific to the second interface mode;
enable, in response to transitioning the head mounted display into the second interface mode, the second set of supported spoken commands that are specific to the second interface mode,
wherein the second interface mode corresponds to a current state of a user interface of the head mounted display; and
wherein the second interface mode and the first interface mode are each one of multiple interface modes each corresponding to alternate states of the user interface of the head mounted display, each of the multiple interface modes having a different set of supported spoken commands;
while the head mounted display is in the second interface mode, and responsive to the second set of supported spoken commands being enabled:
receive audio data captured by at least one audio sensor of the head mounted display;
analyze the audio data to determine whether any of the second set of supported spoken commands that are specific to the second interface mode are included in the audio data;
determine whether the audio data contains a given spoken command, of the second set of supported spoken commands and that the audio data is received within a threshold period of time; and
cause, in response to the determination that the audio data, received within the threshold period of time, contains the given spoken command, performance of one or more actions, via the head mounted display, that correspond to the given spoken command.

* * * * *